United States Patent [19]

Kawabata et al.

[11] Patent Number: 5,384,516
[45] Date of Patent: Jan. 24, 1995

[54] INFORMATION PROCESSING APPARATUS INCLUDING A CONTROL CIRCUIT FOR CONTROLLING A LIQUID CRYSTAL DISPLAY ILLUMINATION BASED ON WHETHER ILLUMINATIO POWER IS BEING SUPPLIED FROM AN AC POWER SOURCE OR FROM A BATTERY

[75] Inventors: Kenji Kawabata, Ome; Soichiro Ogawa, Mizuho; Susumu Iijima, Ome; Kunio Seki, Hinode; Hirotaka Mochizuki, Fujioka; Makoto Goto, Takasaki; Ryuichi Ikeda, Yokohama; Motohiro Sugino, Fujisawa; Kenichi Onda, Hitachi, all of Japan

[73] Assignees: Hitachi, Ltd.; Hitachi Microcomputer System, Ltd.; Hitachi Video & Information System, Inc., all of Japan

[21] Appl. No.: 970,396

[22] Filed: Nov. 2, 1992

[30] Foreign Application Priority Data

Nov. 6, 1991 [JP] Japan .................. 3-289751

[51] Int. Cl.⁶ .......................................... H05R 41/42
[52] U.S. Cl. ...................... 315/160; 315/175; 315/209 R; 315/226; 315/307

[58] Field of Search ................ 315/209 R, 57, 58, 76, 315/119, 120, 127, 128, 174, 219, 225, 226, 276, 307, 308, DIG. 2, DIG. 4, DIG. 5, DIG. 7, 160, 175

[56] References Cited

U.S. PATENT DOCUMENTS

| 4,816,720 | 3/1989 | Nomoto et al. | 315/226 X |
| 5,066,894 | 11/1991 | Klier | 315/209 R X |
| 5,166,579 | 11/1992 | Kawabata et al. | 315/209 R |

FOREIGN PATENT DOCUMENTS 63-81795 4/1988 Japan .

Primary Examiner—David Mis
Attorney, Agent, or Firm—Fay, Sharpe, Beall, Fagan, Minnich & McKee

[57] ABSTRACT

An information processing apparatus employs a liquid crystal display and a fluorescent lamp for backlighting the screen of the liquid crystal display. A lighting circuit for supplying alternating current lighting power to the fluorescent lamp receives input power from either a commercial alternating current power source or from a direct current battery. The level of the lighting power supplied to the fluorescent lamp is determined based upon a determination of whether the input power is being supplied from the commercial power source or from the battery.

19 Claims, 18 Drawing Sheets

FIG. 10
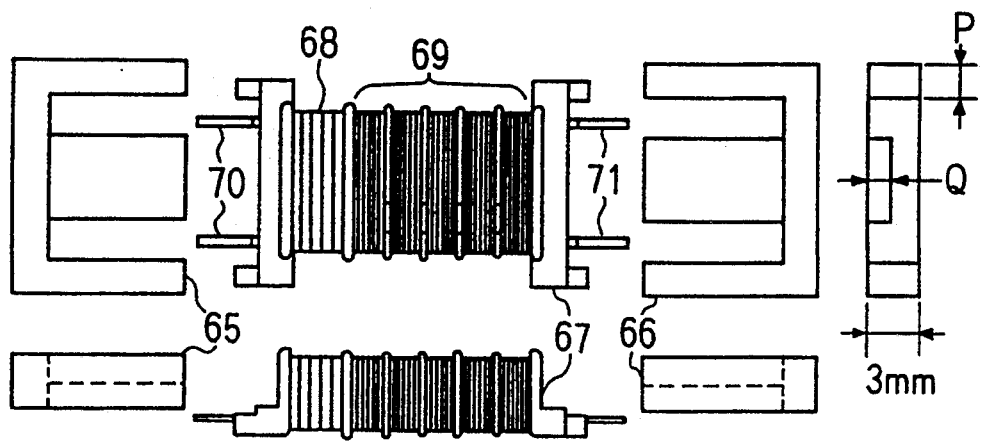
FIGURE OF STRUCTURE
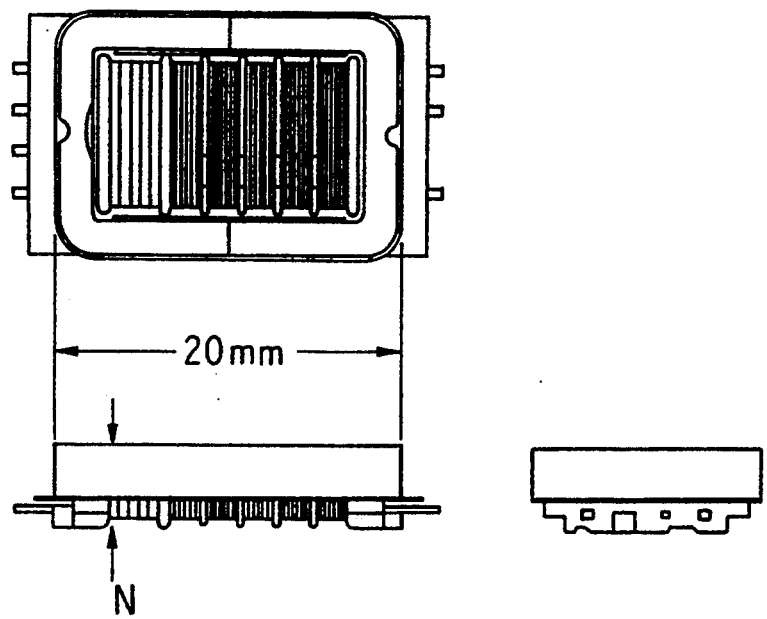
FIGURE OF APPEARANCE

INFORMATION PROCESSING APPARATUS INCLUDING A CONTROL CIRCUIT FOR CONTROLLING A LIQUID CRYSTAL DISPLAY ILLUMINATION BASED ON WHETHER ILLUMINATIO POWER IS BEING SUPPLIED FROM AN AC POWER SOURCE OR FROM A BATTERY

BACKGROUND OF THE INVENTION

The present invention relates to an information processing apparatus with a liquid crystal display, such as a personal computer or a word processor, and, more particularly, to a lighting device for powering a backlighting light source, suitable for a compact, thin liquid crystal display.

A prior art discharge lamp lighting device disclosed in Japanese Patent Laid-open (Kokai) No. Sho 63-81795 has two switching elements connected in parallel to a capacitor and a discharge lamp, and closes the switching elements alternately to supply a high-frequency current to the discharge lamp.

Referring to FIG. 1 showing the prior art discharge lamp lighting device, an ac power source 1 applies an ac voltage through a dimmer 2 to a full-wave rectifier 3, and the full-wave rectifier rectifies the ac voltage to provide a dc voltage.

The discharge lamp 8 is a hot-cathode discharge lamp provided with filaments 9 and 10. Generally, the discharge lamp 8 is started by applying a firing potential across the opposite terminals thereof after heating the filaments 9 and 10.

In the circuit shown in FIG. 1, when preheating the filaments 9 and 10, namely, electrodes, switching elements 4 and 7 are opened or closed simultaneously and switching elements 5 and 6 are opened or closed simultaneously. The switching elements 4 and 7 are closed when the switching elements 5 and 6 are opened and vice versa. A current flows from the high-voltage side to the low-voltage side alternately through a path consisting of the switching element 4, the filament 9, a capacitor 11 and the switching element 7 and through a path consisting of the switching element 7, the capacitor 11, the filament 9, the switching element 6 and the filament 10 to preheat the filaments 9 and 10.

When applying the firing potential to the discharge lamp 8, first the switching elements 4 and 7 are closed to charge the capacitor 11. In this state, the terminal of the capacitor 11 on the side of the discharge lamp 8 is positive. Then, the switching elements 4 and 7 are opened and the switching element 5 is closed, and the dc voltage and the voltage of the capacitor 11 are applied to the discharge lamp 8 to start the discharge lamp 8. After the discharge lamp 8 has been started, the switching elements 4 and 6 are held open and the switching elements 5 and 7 are closed alternately. Then, an ac current flows alternately through a path extending from the high-voltage side through the switching element 5, the capacitor 11 and the discharge lamp 8 to the low-voltage side and through a path extending from the capacitor through the switching element 7 and the discharge lamp 8 to the capacitor 11.

The prior art discharge lamp lighting device having the circuit shown in FIG. 1 varies the intensity of light emitted by the discharge lamp 8 by the following method. A voltage provided by dividing the supply voltage of an ac power source 1 by resistors 12 and 13 is applied to one of the input terminals of a voltage comparator 14, and the output voltage of a reference power source 15 is applied to the other input terminal of the voltage comparator 14. The output voltage of the reference power source 15 has a value between a voltage to be applied to the voltage comparator 14 when the dimmer 2 is conducting and a voltage to be applied to the voltage comparator 14 when the dimmer is nonconducting. Therefore, the output of the voltage comparator 14 is LOW while the dimmer 2 is conducting and HIGH while the dimmer is nonconducting. A period in which the dimmer 2 is nonconducting can be determined by measuring a period in which the output of the voltage comparator 14 is HIGH, as determined by counting clock pulses generated by a first reference clock 17 using a counter 16. Digital data representing light intensity control information thus obtained are latched by a latch 18.

The frequency of a driving signal for driving the switching elements 4, 5, 6 and 7 is determined by dividing the frequency of the output voltage of a second reference clock 20 by a frequency divider 19. The dividing ratio of the frequency divider 19 is determined on the basis of the digital data latched by the latch 18.

When the period in which the dimmer 2 is nonconducting is thus varied, the frequency of the driving signal for driving the switching elements 4, 5, 6 and 7 varies accordingly to vary the impedance of the capacitor 11 and, consequently, the current flowing through the discharge lamp 8 is varied to vary the intensity of light emitted by the discharge lamp 8.

When starting the discharge lamp, a firing potential, which depends on the discharging method of the discharge lamp, in the range of several hundreds volts to about one thousand volts must be applied to the discharge lamp. The discharge lump needs a circuit element called a ballast to stabilize current flow after the discharge lamp has been started. Generally a capacitor or an inductor is used as the ballast as mentioned in the cited prior art.

Incidentally, a battery is often used as a power source for an information processing apparatus with a liquid crystal display, particularly for a portable information processing apparatus with a liquid crystal display, and, in most cases, the output voltage of the battery is relatively low, on the order of 10 V. Accordingly, the output voltage of the battery must be augmented by a transformer to apply a high firing potential to the internal fluorescent lamp of the liquid crystal display of the information processing apparatus.

Reduction in size of the information processing apparatus with a liquid crystal display has been limited by electronic parts which are difficult to miniaturize, such as a transformer, an inductor and a capacitor.

SUMMARY OF THE INVENTION

Referring to FIG. 2 showing an information processing apparatus 21 provided with a liquid crystal display, there are shown a lid unit 101, the liquid crystal screen 22 of a liquid crystal display, a fluorescent lamp 23, namely, a backlighting light source for the liquid crystal display, a lighting device 24 for lighting the fluorescent lamp 23, and a dimmer 25 for adjusting the brightness of the fluorescent lamp 23. Information entered by operating a keyboard or the like is processed by an arithmetic circuit consisting of integrated circuits and the like included in an information processing unit, and desired information is displayed on the liquid crystal screen 22.

Although this information processing apparatus 21 is featured by its thin, compact construction, the information processing apparatus 21 needs a light source for backlighting to secure satisfactory visibility because the liquid crystal does not emit light.

A fluorescent lamp, which can easily be formed in a small size, and which is capable of emitting light at a relatively high luminous efficiency and has a relatively high brightness maintenance factor as compared with other light sources, is used in many cases. The liquid crystal display of the information processing apparatus 21 is provided with such a fluorescent lamp 23 as a backlighting light source.

The output voltage of the power source of this information processing apparatus is on the order of 10 V, whereas a voltage in the range of several hundred volts to one thousand volts is necessary to start the fluorescent lamp 23. The information processing apparatus 21 is thus provided with a lighting device 24 comprising electronic parts, which are difficult to miniaturize, such as a transformer and a capacitor. Therefore it is difficult to construct the lighting device 24 in a thin, compact construction, which is an impediment to the reduction of the size and thickness of the information processing apparatus 21.

As shown in FIG. 2, the lighting device 24 is disposed in a space separating the lid unit 101 and the liquid crystal screen 22. In this information processing apparatus 21, although the size of the liquid crystal screen 22 must be as large as possible to secure satisfactory visibility and the lid unit 101 must be as compact as possible to facilitate transporting the information processing apparatus 21, such requirements are contradictory. Accordingly, the space in which the lighting device (namely, a circuit board provided with a lighting circuit and associated parts) is disposed must be reduced to the least possible extent, and the lighting device 24 must be formed in the smallest possible compact construction. Furthermore, since the lid unit 101 of the information processing apparatus must be formed in a very small thickness for the information processing apparatus 21 to have a compact construction, the lighting device 24 to be disposed in the lid unit 101 must be formed in a very small thickness.

The information processing apparatus 21 with a liquid display shown in FIG. 2 comprises the lid unit 101, and an information processing unit 103 provided with a keyboard and internal semiconductor electronic circuits including a CPU and memories. The lid unit 101 and the information processing unit 103 are joined together with two hinges 102 (only one of which is shown). When using the information processing apparatus 21, the information processing unit 103 is put on a desk and the lid unit 101 is opened in a position shown in FIG. 2. When the information processing apparatus 21 is not used, the lid unit 101 is turned on the hinges 102 to close the same and the lid unit 101 is locked to the information processing unit 103 with a locking mechanism, not shown, to facilitate transportation.

It is a principal object of the present invention to provide an information processing apparatus with a liquid crystal display securing satisfactory visibility, having a very compact, very thin construction and provided with a compact, thin lighting device for lighting a fluorescent lamp.

1. Means for Achieving a First Object of the Invention

A means for achieving a first object of the invention applies an ac voltage of a frequency in the range of 60 kHz to 300 kHz, preferably, in the range of 80 kHz to 300 kHz, which is higher than the frequency (on the order of 50 kHz) of an ac voltage used by the prior art, to a fluorescent lamp for backlighting a liquid crystal display.

A semiconductor IC chip provided with switching elements and a control circuit for controlling the switching elements is employed to reduce the number of component parts.

The lower limit frequency of 60 kHz or 80 kHz of the ac voltage to be applied to the fluorescent lamp is determined taking into consideration restrictions on the thickness of a transformer to be used, and the upper limit frequency of 300 kHz is determined taking into consideration the starting characteristics of the fluorescent lamp.

1-1 Liquid Crystal Display

The construction and operation of a liquid crystal display employed in the present invention will be described hereinafter with reference to FIG. 3, which shows the liquid crystal display of the information processing apparatus shown in FIG. 2, and FIG. 4, which shows a lighting device provided with a wiring board, in which parts like or corresponding to those shown in FIG. 2 are denoted by the same reference characters.

Referring to FIGS. 3 and 4, there are shown a lighting device 24, a power circuit 39 for supplying power to the lighting device 24, an output connector 31, lead wires 29 and 30 connecting the output connector 31 to a fluorescent lamp 23, a transformer 32, a capacitor 33, an IC package 34 integrally comprising switching elements 42, 43, 44 and 45 and a control circuit for controlling the switching elements 42, 43, 44 and 45 (comprising an inverter 46, pulse generators 47 and 76, a switch 75 and a switch control circuit 77 for controlling the switch 75), and an input connector 37 for connecting the power circuit 39 to the lighting device 24 to apply the output voltage of the power circuit 39 to the lighting device 24.

The frequency of a pulse signal generated by the pulse generator 47 can be adjusted to an optional frequency by a variable resistor 48. A dc-to-dc converter 55 comprises a chopper transistor 38, a choke coil 36, a smoothing capacitor 35, a diode 40, a pulse generator 41, resistors 53 and 54 and a transistor 52.

The information processing apparatus shown in FIG. 2 is compact, thin and portable. To enable the use of the information processing apparatus even if an ac power source is unavailable, the information processing apparatus is provided with a rechargeable battery. Naturally, the information processing apparatus may be powered only by a dry battery.

Referring to FIG. 6, which shows the circuit configuration of the power circuit 39 included in the information processing apparatus of FIG. 2, an ac adapter 57 converts an ac voltage supplied from a commercial ac power source 64 into a dc voltage. The ac voltage of the commercial ac power source 64 is applied through an outlet 56 to the ac adapter 57, and then the ac adapter 57 applies a dc voltage of about 15 V to the power circuit 39. The ac adapter 57 may be detachable.

The power circuit 39 comprises diodes 58 and 59, a resistor 61, a switch 62, a secondary battery 60 and a voltage detector 63 for detecting the output voltage of the secondary battery 60.

When an outlet of the commercial ac power source 64 is available nearby, the ac adapter 57 is connected to the commercial ac power source 64 to apply a dc voltage of about 15 V through the resistor 61 and the switch 62 to the secondary battery 60 to charge the secondary battery 60, and to apply the dc voltage through the diode 58 to the lighting device 24 to light the fluorescent lamp 23. The voltage applied to the lighting device 24 is about 15 V. The voltage applied across the terminals of the secondary battery 60 is lower than about 15 V by a voltage drop caused by the resistor 61. The output voltage of the secondary battery 60 decreases to a voltage of 9 V or below as the secondary battery 60 is discharged, but the terminal voltage of the secondary battery 60 increases gradually as the secondary battery 60 is charged by using the ac adapter 57. Upon the detection of the increase of the terminal voltage of the secondary battery 60 beyond a predetermined voltage (namely, a voltage on the order of 10 V) by the voltage detector 63, the switch 62 is opened to stop charging of the secondary battery 60 to prevent reduction of the life of the secondary battery 60 by overcharging. The difference between the output voltage of the ac adapter 57 and the terminal voltage of the secondary battery 60 is necessary because a charging current that is higher than a certain value must be supplied to the secondary battery 60 to reduce the time required for charging the secondary battery 60.

When no commercial ac power source is available nearby, making it impossible to supply power through the ac adapter 57 to the lighting device 24, the secondary battery 60 applies a dc voltage through the diode 59 to the lighting device 24. The output voltage of the secondary battery 60 is in the range of about 9 V to about 10 V.

Thus, the difference between the voltage of the power supplied from the commercial power source through the ac adapter 57 to the lighting device 24 and that of the power supplied from the secondary battery 60 to the same is large, and the output voltage of the secondary battery 60 decreases gradually as the energy stored in the second battery 60 is consumed. The dc-to-dc converter 55 stabilizes the voltage so that the brightness of the fluorescent lamp 23 will not vary, which maintains the visibility of the display constant even if the dc voltage applied to the lighting device 24 is changed or varies.

The operation of the dc-to-dc converter 55 will be briefly described with reference to FIG. 4. Referring to FIG. 4, the dc voltage applied to the lighting device 24 is chopped by the chopper transistor 38, and the chopped voltage waveform is smoothed by the choke coil 36 and the smoothing capacitor 35. The smoothed dc voltage is applied to the input terminal A of the pulse generator 41 and the chopping duty factor is controlled so that the smoothed dc voltage is constant. The pulse generator 41 consists of the voltage comparator 50 and the reference sawtooth wave generator 51.

Referring to FIG. 5, the output voltage of the reference sawtooth wave generator 51 is always uniform as indicated by a waveform (a). The voltage comparator 50 compares the output voltage of the reference sawtooth wave generator 51 and a voltage of a waveform (b) applied to the input terminal A of the pulse generator 41. A pulse of a waveform (d) appears at the output terminal B of the pulse generator 41 during a period in which the voltage applied to the input terminal A of the pulse generator 41 is lower than the output voltage of the reference sawtooth wave generator 51. When the pulse appears at the output terminal B, a base current flows through the resistor 54 to the base of the transistor 52 and the transistor 52 becomes conducting. Then, the base current flows to the chopper transistor 38 and the chopper transistor 38 becomes conducting.

For example, if the smoothed dc voltage drops as indicated by a waveform (c) in FIG. 5 due to some cause, the period in which the chopper transistor 38 is in the ON-state increases as indicated by a waveform (e) and, consequently, the period of application of the voltage through the chopper transistor 38 and the choke coil 36 to charge the smoothing capacitor 35 is extended to increase the smoothed dc voltage, so that the output voltage is maintained constant. The diode 40 absorbs the kickback voltage produced when the current flowing through the choke coil 36 is chopped.

The operation of the lighting circuit 24 for converting the thus-stabilized dc voltage into high-frequency, high voltage will be described with reference to FIG. 4. The switching elements 42 and 45 are operated simultaneously and the switching elements 43 and 44 are operated simultaneously. The switching elements 42 and 44 are closed alternately and the switching elements 43 and 45 are closed alternately. The switching elements 43 and 44 are controlled directly by the pulse generated by the pulse generator 47, and the switching elements 42 and 45 are controlled by a signal obtained by inverting the pulse generated by the pulse generator 47 by the inverter 46.

The switching elements 42, 43, 44 and 45 are thus controlled for on-off operation to make the current flow from the higher side to the lower side of the smoothed dc voltage alternately through a path consisting of the switching element 42, the capacitor 33, the primary winding of the transformer 32 and the switching element 45 and through a path consisting of the switching element 43, the primary winding of the transformer 32, the capacitor 33 and the switching element 44, so that the secondary winding of the transformer 32 provides an ac voltage.

The first resonance frequency of the resonant circuit is substantially dependent on the inductance of the primary winding of the transformer 32 and the capacitance of the capacitor 33 when the fluorescent lamp 23 has not been lighted yet. Since series resonance occurs in the resonant circuit, the output voltage reaches a maximum near the first resonance frequency. Accordingly, the frequency of the output pulse signal of the pulse generator 76 is set to a frequency nearly equal to the first resonance frequency. When the switch control circuit 77 controls the switch 75 to connect the pulse generator 76 to the circuit, a high voltage is applied across the electrodes of the fluorescent lamp 23, whereby the fluorescent lamp 23 is started.

FIG. 7(a) shows the relation between the frequency and the terminal voltage of the fluorescent lamp 23.

After the fluorescent lamp 23 has been lighted, the resonance frequency decreases due to leakage inductance in the transformer 32 and the current flowing through the fluorescent lamp 23 reaches a maximum at the second resonance frequency. Then, the switch control circuit 77 controls the switch 75 to connect the pulse generator 47 to the circuit. The frequency of the output pulse signal of the pulse generator 47 can be adjusted to an optimal frequency not lower than the second resonance frequency by adjusting the variable resistor 48.

FIG. 7(b) shows the relation between the operating frequency and the current flowing through the fluorescent lamp 23. Thus, the operating frequency is varied in a frequency range higher than the second resonance frequency to vary the intensity of the current flowing through the fluorescent lamp 23, whereby the intensity of light emitted by the fluorescent lamp 23 is varied.

Referring again to FIG. 3, the light emitted by the fluorescent lamp 23 is reflected through the side edge into the interior of a light guide plate 27 by a reflector 28. The back surface (namely, the surface opposite the surface in contact with a light diffusing board 26) of the light guide plate 27 is coated with a paint having a high reflectivity. Therefore, the light introduced into the interior of the light guide plate 27 is reflected repeatedly for multiple reflection by the opposite surfaces of the light guide plate 27 and, finally, goes out through the surface of the light guide plate 27 in contact with the light diffusing board 26 in a substantially uniform distribution. The light diffusing board 26 further diffuses the light diffused by the light guide plate 27 to illuminate the liquid crystal screen 22 uniformly from behind so that images displayed on the liquid crystal screen 22 are separated clearly from the background.

1-2 Size of the Lighting Device

The fluorescent lamp 23, namely, the light source, emits light at a maximum luminous efficiency when the diameter thereof is in the range of about 2.5 mm to about 3.5 mm; that is, the luminous efficiency of a fluorescent lamp increases to a maximum when the surface temperature of the fluorescent lamp is in the range of about 40° C. to about 50° C., and the surface temperature is in such a temperature range when the diameter thereof is in the range of about 2.5 mm to 3.5 mm. If the diameter of the fluorescent lamp 23 is smaller than about 2.5 mm, the surface temperature of the fluorescent lamp 23 increases beyond the optimum temperature because the area of the heat radiating surface is excessively small. If the diameter of the fluorescent lamp 23 is greater than about 3.5 mm, the surface temperature of the fluorescent lamp 23 is unable to rise to the optimum temperature.

The reflector 28, in general, is formed by coating a resin film with a metal film by vacuum evaporation. If the reflector 28 is put on the fluorescent lamp in close contact with the fluorescent lamp 23, the spurious capacitance between the fluorescent lamp 23 and the reflector 28 increases, and high-frequency current leaks through the spurious capacitance to reduce the luminous efficiency, or the firing voltage is divided for the fluorescent lamp 23 and the spurious capacitance and the working voltage drops, deteriorating the starting performance of the fluorescent lamp 23. Therefore, the reflector 28 is disposed with a gap on the order of 1 mm between the reflector 28 and the surface of the fluorescent lamp 23.

Thus an optimum thickness C (FIG. 3) of a laminate structure consisting of the light guide plate 27, the light diffusing board 26 and the liquid crystal screen 22 is in the range of about 4.5 mm to about 5.5 mm. Accordingly, it is preferable to form the lighting device 24 to have a thickness D in the range of about 4.5 mm to about 5.5 mm to avoid forming a dead space in the lid unit 101.

The size of the liquid crystal screen of portable information processing apparatus, in general, is on the order of 8 in. The liquid crystal screen 22 of the liquid crystal display of the information processing apparatus of the present invention may be of such a size. The width E (FIG. 3) of the 8 in. liquid crystal screen is about 110 mm. Therefore, it is preferable to form the lighting device 24 to have a length F (FIG. 3) not greater than 110 mm to avoid forming a large dead space in the lid unit 101. The lighting device 24 (wiring board) having a length F not greater than 110 mm can be satisfactorily used in combination with a liquid crystal screen greater than 8 in. because the width E of the liquid crystal screen is greater than 110 mm.

It is desirable to employ a large liquid crystal screen from the viewpoint of improving the visibility of the displayed information, whereas it is required, from the viewpoint of facilitating the transportation of the information processing apparatus and saving space for storing the information processing apparatus, to reduce the volume and size of the information processing apparatus. Accordingly, it is desirable that the margin around the liquid crystal screen in the surface of the lid unit 101 provided with the liquid crystal screen is reduced to the least possible extent; that is, it is ideal that the entire area of the surface of the lid unit 101 is occupied by the liquid crystal screen. Accordingly, it is desirable to reduce the thickness G (FIG. 3) of the lighting device 24 to the least possible extent. The present invention is intended to reduce the thickness G of the lighting device 24 to the least possible extent and to construct the lighting device 24 using a relatively small number of parts, and hence the present invention employs a semiconductor chip provided with an integrated circuit comprising the switching elements and the switch control circuit for controlling the switching elements.

Reduction in the thickness G of the lighting device 24 (wiring board) is limited by the size of the package containing the semiconductor chip, which will be described later. It is necessary that the thermal resistance between the semiconductor chip and the atmosphere is relatively small because the IC package 34 comprises the switching elements, and the size of the IC package 34 should be as small as possible because the size of the IC package 34 is a significant factor in determining the size of the lighting device 24.

FIGS. 8 and 9 show IC packages containing semiconductor chips. To meet the foregoing requirements, the width H of the IC package shown in FIG. 8 and the width I of the IC package shown in FIG. 9 are about 11 mm, the reason of which will be described later. Therefore, the width of the lighting device 24 including the width of spaces for soldering is about 12 mm at the minimum. Thus, desirably, the lighting device 24 has a thickness in the range of 4.5 mm to 5.5 mm, a length of 110 mm or below and a width of 12 mm or below.

1-3 Size and Shape of the Transformer

Referring to FIG. 10, there are shown E-shaped ferrite cores 65 and 66, a bobbin 67, a primary winding 68 wound on the bobbin 67, a secondary winding 69 wound on the bobbin 67, and lead wires 70 and 71. The E-shaped ferrite cores 65 and 66 are joined together as shown in FIG. 10. The opposite ends of the primary winding 68 are connected to the lead wires 70, respectively, and the opposite ends of the secondary winding 69 are connected to the lead wires 71, respectively. When the transformer is to be employed in the lighting device 24, the thickness H of the transformer must be about 5.5 mm or below.

FIG. 11 shows the relation between the thickness H of the transformer and frequency. The impedance of the transformer is equal to the product of the angular frequency of the current that flows through the transformer and the inductance. Therefore, the inductance may be smaller when the angular frequency is higher for a fixed impedance. Since the inductance is dependent on the number of turns of the winding and the sectional area of the core and the like, the number of turns and the size of the core may be smaller when the angular frequency is higher when the impedance is fixed. The input voltage applied to the transformer, the frequency of the current, the number of turns and the sectional area of the core of the transformer are expressed by:

$$V_{in} = 4 \cdot f \cdot k \cdot n \cdot A_c \cdot B_m \qquad (1)$$

where $V_{in}$ is the input voltage (V) applied to the transformer, f is the frequency (Hz), k is the form factor of the voltage wave, n is the number of turns of the primary winding, $A_c$ is the sectional area (m²) of the core and $B_m$ is the magnetic flux density (T).

The output voltage of the 12 V dc power source is expected to vary in the range of ±15%, the and input voltage $V_{in}$ applied to the transformer is 13.8 V at the maximum. If n=30 and k=1.11 (sine wave), the maximum magnetic flux density over the core is 0.27 T. In FIG. 10, the size P of the core is 1.7 mm.

If the thickness H of the transformer is 4.5 mm or below, the transformer can be employed in all the lighting devices having a thickness in the range of about 4.5 mm to about 5.5 mm.

The thickness of the core of the transformer must be about 3 mm or below to form the transformer to have a thickness of 4.5 mm or below. Substituting these conditions into the expression (1), it is found that the frequency f must be about 80 kHz or higher. However, when designing transformers respectively for lighting devices differing from each other in thickness and each having a thickness in the range of about 4.5 mm to 5.5 mm, the upper limit of the thickness of the core may be 4 mm. When the thickness of the core of the transformer is 4 mm, the frequency may be 60 kHz or higher.

If the size P=1.7 mm (FIG. 10) is increased, the frequency may be lower, and if the size P is increased simply, the frequency may be decreased. However, if the size Q (FIG. 10) is not increased when the size P is increased, the magnetic flux density increases and magnetic saturation occurs. If the size Q is increased to avoid magnetic saturation, the space for the winding is reduced and the number of turns of the coil needs to be reduced. Consequently, the calculated lower limit frequency is very high.

Although the frequency can be reduced by increasing the number of turns of the primary winding beyond thirty, the number of turns of the secondary winding must be increased to avoid reduction of the secondary voltage when the number of turns of the primary winding is increased.

The sizes P and Q need to be reduced to increase the number of turns of the secondary winding without increasing the length and width of the transformer. Accordingly, the frequency cannot be lowered.

Theoretically, the frequency can be lowered simply by increasing the magnetic flux density over the core. However, an increase in the magnetic flux density entails increase in the power loss of the transformer.

Although dependent on the arrangement and power supplied to the transformer, the temperature of the ambience surrounding the transformer is, in general, on the order of 50° C. Since the temperature which the liquid crystal display is able to withstand is on the order of 80° C. at the highest, the temperature rise of the transformer must be 30° C. or below. The power loss of the transformer must be 0.3 W or below to limit the temperature rise to 30° C. or below. A magnetic flux density of 0.27 T meets the foregoing requirements.

As mentioned above, the length of the lighting device 24 must be 110 mm or below. Since the respective lengths J and K of the IC packages shown in FIGS. 8 and 9 are about 20 mm, the length of the connector is about 30 mm, the length of a space in which the dc-to-dc converter is disposed is about 20 mm, and the length of a space in which the capacitor for resonance is disposed is about 10 mm, the transformer of 20 mm in length as shown in FIG. 10 can be employed in a lighting device 24 having a length of 110 mm or below.

1-4 Upper Limit Frequency

The upper limit frequency is dependent on conditions for surely starting the fluorescent lamp. To start the fluorescent lamp without fail, the impedance of the fluorescent lamp must be higher than an impedance calculated using the sum of the spurious capacitance of the secondary winding of the transformer and the spurious capacitance of wiring for the fluorescent lamp. If the impedance of the fluorescent lamp is lower than the impedance of the spurious capacitance, a major portion of the output current flows through the side of the spurious capacitance, the current flowing through the fluorescent lamp is reduced and thereby the impedance of the fluorescent lamp increases. Consequently, the current flowing through the fluorescent lamp decreases sharply and discharge within the tube of the fluorescent lamp cannot be maintained.

The impedance of the fluorescent lamp, namely, the light source, is on the order of 150 kΩ at the lowest, when the ambient temperature is equal to the lower limit temperature for the liquid crystal display, at which the fluorescent lamp is most difficult to start, and the current supplied to the fluorescent lamp is 2 mA. Since the spurious capacitance, in general, is on the order of 3 pF, the spurious capacitance is equal to the impedance of the fluorescent lamp when the frequency is on the order of 300 kHz, which is evident from the relation between the impedance of the spurious capacitance and the frequency shown in FIG. 12.

1-5 Switching Elements

The switching elements, and the switching element control circuit or part of the switching element control circuit, are formed integrally on the semiconductor chip to miniaturize the lighting device 24. If the switching elements are bipolar transistors, switching loss increases when the switching element is operated by signals of a high frequency in the range of 60 kHz to 300 kHz, and preferably in the range of 80 kHz to 300 kHz, because the switching speed of a bipolar transistor is low. Therefore, the present invention employs MOSFETs, the switching speed of which is high.

1-6 IC Package

It is desirable to form the IC package containing the semiconductor integrated circuit in the smallest possible size to miniaturize the lighting device 24. However, since the heat radiating surface area is excessively small if the size of the IC package is excessively small, the heat resistance between the IC chip and the atmosphere is high. On the other hand, the lighting device for lighting the fluorescent lamp for backlighting the liquid crystal display of the portable information processing apparatus is unable to employ a large IC package because there are dimensional restrictions on the lighting device.

Accordingly, the ON-resistance of the switching elements must be adequately small to maintain the IC chip at an adequately low temperature so that the reliability of the semiconductor IC is not deteriorated. Generally, the upper limit temperature of the IC chip is 100° C. and the ambience of the lighting device of the portable information processing apparatus rises to a temperature on the order of 50° C. When the dimensional restrictions on the package are taken into consideration, the thermal resistance of the IC chip mounted on a glass-epoxy wiring board, namely, a glass cloth base epoxy resin laminate provided with a printed wiring pattern, is 60° C./W above. Therefore, the power loss of the IC chip must be 8 W or below. Since the power loss of the IC chip increases with the increase of input current, the relation between the current supplied to the lighting device to suppress the power loss of the switching elements of the information processing apparatus below 0.8 W and the upper limit of the ON-resistance of the switching elements can be determined.

2. Means for Achieving a Second Object of the Invention

As is generally known, the terminal voltage of the fluorescent lamp increases and the surface temperature of the fluorescent lamp rises beyond a normal temperature in the last stage of life of the fluorescent lamp. The liquid crystal of the display will be damaged and, in the worst case, the liquid crystal will be destroyed if the surface temperature of the fluorescent lamp rises excessively. To avoid damaging the liquid crystal, it has been a general practice to provide a thermal fuse at the end of the tube of the fluorescent lamp, the temperature of which is higher than that of other portions, so that the thermal fuse is blown to stop the supply of power to the lighting device when the temperature of the fluorescent lamp rises beyond a limit temperature. However, the operating temperature of the thermal fuse is greatly dependent on the mode of contact of the thermal fuse with the fluorescent lamp. When replacing the fluorescent lamp with a new one after the life of the fluorescent lamp has terminated, the thermal fuse needs to be put on the new fluorescent lamp and the wiring associated with the thermal fuse needs to be reconnected, which makes maintenance troublesome. Another method of protecting the liquid crystal without employing a thermal fuse stops the operation of the lighting device upon the detection of a rise of the temperature of the opposite ends of the fluorescent lamp beyond a predetermined temperature, which, however, needs a complicated circuit making the miniaturization of the information processing apparatus difficult.

A second object of the present invention is to provide a compact information processing apparatus with a liquid crystal display, having an electrical system of a simple circuit configuration including a liquid crystal protecting circuit.

To achieve the object, the present invention employs an IC chip provided with a detecting means for detecting the terminal voltage of a fluorescent lamp after the fluorescent lamp has been started, and a protective circuit which stops the operation of a lighting device when the terminal voltage of the fluorescent lamp detected by the detecting means is higher than a predetermined voltage. Employment of the IC chip enables the protection of the liquid crystal display without requiring additional parts.

When detecting the terminal voltage of several hundred volts of the fluorescent lamp, the voltage is divided by a plurality of resistors and a fraction of the total voltage, which is several volts, is detected, and the detected voltage is compared with a reference voltage by a voltage comparator. If the detected voltage is higher than the reference voltage, the operation of the lighting device is stopped to prevent destroying the liquid crystal display by excessively high heat generated by the fluorescent lamp in the last stage of the life of the fluorescent lamp. Since most parts of these circuits are included in the IC formed on the IC chip, only a few additional parts are needed.

3. Means for Achieving a Third Object of the Invention

The brightness of the fluorescent lamp can be varied by varying the frequency of a signal for driving the switching elements included in the lighting device. When lighting a cold-cathode lamp, a firing potential is applied to the fluorescent lamp for a predetermined time, and then a steady-state fluorescent lamp driving condition is settled. When lighting a hot-cathode fluorescent lamp, the electrodes are heated for a predetermined time, a firing potential is applied across the electrodes, and then a steady-state fluorescent lamp driving condition is settled. If the brightness of the fluorescent lamp is varied before the stabilization of discharge, the current flowing through the fluorescent lamp decreases, the electrodes are not heated to a sufficiently high temperature and unstable discharge may result. Generally, the control of the brightness of the fluorescent lamp is inhibited for a fixed period of time after the fluorescent lamp has been started, because it is possible that such a mode of control of the brightness reduces the line of the fluorescent lamp.

Such a control of the fluorescent lamp can be achieved by properly controlling the frequency of the fluorescent lamp driving signal according to the operating mode of the fluorescent lamp. Since the starting performance and life of the fluorescent lamp is greatly dependent on the duration of each operating mode, the duration of each operating mode must be accurately determined.

Generally, the period of driving the switching elements is very short as compared with the duration of each operating mode. Therefore, a frequency divider having a large number of gates is needed to determine the duration of each operating mode by dividing the frequency of the signal for driving the switching element. Such a frequency divider increases the cost of the lighting device.

A third object of the present invention is to provide a highly reliable information processing apparatus with a liquid crystal display, provided with a means for determining the duration of each operating mode, which affects the starting performance and life of the fluorescent lamp, without requiring a frequency divider having a large number of gates.

To achieve the object, the information processing apparatus is provided with an oscillation circuit oscillating at a frequency far lower than the frequency of a lighting signal, and a frequency divider for dividing the low frequency of the output voltage of the oscillation circuit to determine the duration of each operating mode.

Since the frequency of the output voltage of the oscillation circuit is very low, the frequency divider needs a very small number of gates. The operation of the oscillation circuit may be stopped after the steady-state fluorescent lamp driving condition has been settled to save power.

4. Means for Achieving a Fourth Object of the Invention

It will be possible that the lighting device is destroyed if an overcurrent flows through the lighting device due to the accidental short-circuiting of the load. Therefore, the information processing apparatus, in general, is provided with an overcurrent protection device which detects the current flowing through the switching elements and stops the operation of the lighting device upon the detection of an overcurrent to protect the lighting device.

However, it is possible that such an overcurrent protection device responds erroneously to noise and stops the operation of the lighting device to turn out the fluorescent lamp even if a normal current is flowing through the lighting device. If the fluorescent lamp is turned out accidentally, the information displayed on the liquid crystal display cannot be recognized, which, in the worst case, may possibly cause a great economic loss.

A fourth object of the present invention is to provide a reliable lighting device for lighting a backlighting light source for backlighting the liquid crystal screen of a liquid crystal display which is, capable of avoiding an erroneous response to noise generated by an overcurrent protection device.

This object of the invention is achieved by automatically restarting the lighting device a predetermined time after the lighting device has been stopped by the operation of the overcurrent protection device. The time is predetermined on the basis of the very low frequency of oscillation of the oscillation circuit. Thus, the fluorescent lamp backlighting the liquid crystal screen can be restarted in a very short time after the same has been turned out due to the erroneous operation of the overcurrent protection device, so that the operator will not substantially experience the effect of the erroneous operation of the overcurrent protection device.

Even if the fluorescent lamp is restarted after the same has been turned out upon the detection of an actual overcurrent, the lighting device will not be heated excessively and damaged by an overcurrent provided that the fluorescent lamp is restarted a sufficient time after the same has been turned out. Desirably, the restart of the fluorescent lamp is suspended for a predetermined time in the range of 0.001 sec to 1 sec, which is adequately shorter than a visually sensible time and sufficiently longer than the reaction time of the overcurrent protection device. The predetermined time is determined by using the very low frequency of the output signal of the oscillation circuit to avoid complicating the circuit configuration of the image processing apparatus.

5. Means for Achieving a Fifth Object of the Invention

As stated in article 1, the lighting device of the information processing apparatus of the present invention can be powered by either a commercial ac power source through an ac adapter or a secondary battery. The difference between the supply voltage obtained from the ac adapter and the supply voltage obtained from the secondary battery is large, and the supply voltage obtained from the secondary battery changes in a wide range. If the supply voltage drops excessively below a voltage needed to secure the operation of the logic circuit for controlling the switching elements, the logic level becomes unstable and the switching elements remains closed. In such a case, it is possible that an overcurrent flows through the switching elements and destroys the same. If the supply voltage is excessively high, it is possible that the lighting device is destroyed by an overvoltage.

When the temperature of the ambience surrounding the lighting device is higher than a predetermined rated temperature, it is possible that the temperature of the lighting device increases beyond an allowable temperature to destroy the lighting device. It is expected positively that the portable information processing apparatus is left in a hot environment, for example, in a car in summer, for a long time. If the information processing apparatus is used when the same is heated at a high temperature, the temperature of the ambience surrounding the lighting device will exceed the allowable temperature.

A fifth object of the present invention is to provide a reliable information processing apparatus with a liquid crystal display which will not break down even if a supply voltage outside an allowable range of voltage is applied to the lighting device, or if the temperature of the ambience surrounding the lighting device is higher than an allowable temperature.

To achieve the object, the present invention detects the supply voltage with a voltage detecting circuit and stops the operation of the lighting device when the supply voltage detected by the voltage detecting circuit is equal to or lower than a first predetermined temperature or equal to or higher than a second predetermined temperature. The temperature of the switching elements are detected and the operation of the lighting device is stopped also when the temperature of the switching elements is equal to or higher than a predetermined temperature.

When the operation of the lighting device is stopped in response to the detection of such an abnormal supply voltage or the detection of such an abnormal temperature, the lighting device is not restarted automatically a predetermined time after the same has been stopped; the lighting device is restarted after the confirmation of the restoration of the normal supply voltage or the normal temperature.

When the load on the IC package is short-circuited, the current flowing through the switching elements is increased at a certain rate by the inductance of the wiring of the information processing apparatus. Therefore, the protective circuit must function at a sufficiently high response speed to protect the switching elements by stopping the operation of the lighting device before an overcurrent flows through the switching elements.

However, it is possible that the switching elements are destroyed in an instant if the supply voltage increases to a voltage higher than as expected or the ambient temperature is very high. It is also possible that the output of the logic circuit becomes unstable and the switching elements remain closed if the supply voltage drops to a voltage lower than that expected.

If the operation of the lighting device is restarted automatically the predetermined time after the operation of the lighting device has been stopped upon the detection of an abnormal condition, it is possible that the lighting device is restarted before the same is restored to its normal condition. In such a case, the detecting circuit operates repeatedly and, in the worst case, the switching elements will be destroyed.

Accordingly, the present invention restarts the lighting device after the supply voltage and the temperature of the switching elements are restored to normal. The protective circuit for protecting the switching elements from an abnormal supply voltage or an excessively high temperature may be provided with a hysteretic function to avoid erroneous response to noise.

The voltage applied to the switching elements is detected instead of the supply voltage to enable the protective circuit to function effectively even if a voltage converter, such as a dc-to-dc converter, is disposed between the switching elements and the power source.

Furthermore, when the operation of the lighting device is stopped upon the detection of an abnormal condition, such as an overcurrent, an overvoltage or an excessively high temperature, a current lower than the rated current is supplied after the lighting device has been restarted.

Particularly, when the brightness of the fluorescent lamp is controlled by varying the impedance of a series resonant circuit consisting of a coil and a capacitor and disposed between the fluorescent lamp and the switching element by controlling the operating frequency, the operating frequency after the restart of the lighting-device is higher than the frequency for supplying the rated current. If the lighting device is operated under the same condition after the same has been stopped by the Operation of the protective circuit and restarted, it is highly possible that an overcurrent is supplied again, the temperature rises excessively or the protective circuit operates again. Accordingly, a current lower than the rated current is supplied when the lighting device is restarted to reduce the probability of unnecessary operation of the protective circuit.

When starting the fluorescent lamp, the oscillating frequency of the switching elements is fixed to start the fluorescent lamp without fail and the output current is suppressed after the fluorescent lamp has been started to reduce the probability of unnecessary operation of the protective circuit.

6. Means for Achieving a Sixth Object of the Invention

As mentioned above, the information processing apparatus is powered by either a commercial ac power source or a secondary battery. When the information processing apparatus is powered by the secondary battery, in particular, it is desirable that the power consumption of the information processing apparatus is as small as possible. On the other hand, a current higher than a fixed level must be supplied to the fluorescent lamp to maintain the visibility of the liquid crystal display above a fixed level.

A sixth object of the present invention is to provide a lighting device for lighting the fluorescent lamp of a liquid crystal display, which is capable of being controlled for operation in an operating mode selected among a plurality of operating modes differing from each other in the power consumption of the fluorescent lamp by an external control signal applied to a control terminal or by the software of the information processing apparatus, or in an operating mode selected optionally by the operator among the plurality of operating modes.

To achieve this object the present invention employs a reference current source consisting of a constant-voltage regulated power supply and a resistor, supplies a current proportional to the output current of the reference current source to charge a capacitor, and determines the operating frequency of a switching element on the basis of a charging time constant.

The operating frequency can easily be varied by changing the resistance of the resistor to change the time for charging the capacitor.

Reference sources are selected among a plurality of reference current sources, and the number of the selected reference current sources is determined by a selection signal applied to a selection terminal to determine the intensity of the charging current selectively.

When power is supplied from a commercial ac power source through the ac adapter, a smaller number of reference current sources are used to extend the charging time for charging the capacitor so that the operating frequency is lowered. Then, the impedance of the resonant circuit comprising the transformer and the capacitor is reduced to increase the current supplied to the fluorescent lamp, so that the brightness of the fluorescent lamp is increased to enhance the visibility. When power is supplied from the secondary battery, a larger number of selected reference current sources are used to reduce the charging time so that the impedance of the resonant circuit is increased. Consequently, the current supplied to the fluorescent lamp is reduced to reduce the power consumption of the fluorescent lamp and thereby to suppress the consumption of the secondary battery.

The number of selected reference current sources can be changed simply by applying a selection signal of HIGH or LOW to the selection terminal without adjusting the resistor when the power source is changed.

The selected power source to which the apparatus is connected, either the commercial ac power source or the secondary battery, is identified from the supply voltage or the voltage applied to the switching elements, and the number of the reference current sources is determined automatically.

The information processing apparatus is provided with a device capable of determining the operating frequency by selectively connecting one of a plurality of selection terminals to a variable resistor for determining the operating frequency. Thus, an operating mode among the plurality of operating modes can easily be selected without using a complicated external circuit.

7. Means for Achieving a Seventh Object of the Invention

As mentioned above, the variation of the supply voltage in a wide range of voltage and the resultant variation of the brightness of the fluorescent lamp are problems when using the secondary battery as a power source.

A voltage converting means, such as a dc-to-dc converter, needs to be disposed between the power source and the lighting device to stabilize the voltage to suppress the variation of the brightness of the fluorescent lamp attributable to the variation of the supply voltage, which, however, needs an additional control circuit for controlling the chopper transistor, the diode, the choke coil and the smoothing circuit.

A seventh object of the present invention is to realize a voltage converter, such as a dc-to-dc converter as shown in FIG. 4, consisting of the fewest necessary circuit elements.

To achieve this object, a control circuit, which is applicable to general purposes, for controlling the chopper transistor of a dc-to-dc converter is incorporated into the IC formed on the IC chip. Since the control circuit is formed on the IC chip, the chopper transistor, the diode, the choke coil and the smoothing capacitor are changed depending on the operating current and voltage to reduce the components of the circuit to the least extent.

The lighting device may be provided with a resetting function which stops the operation of the lighting device when a voltage signal of a logic level, for example, a voltage signal of LOW, is applied to a reset terminal and enables the lighting device to operate when a voltage signal of another logic level, for example, a voltage signal of HIGH, is applied to the reset terminal.

When a voltage signal of LOW is applied to the reset terminal to stop the operation of the lighting device, the operation of the dc-to-dc converter must be stopped to reduce power consumption substantially to zero. If the output voltage of the pulse generator 41 (FIG. 4) is fixed at LOW, a current flows continuously through the resistor 54. It is desirable that the current is reduced to zero while the lighting device is stopped to avoid the unnecessary consumption of the energy stored in the secondary battery. When the resistor 54 is disposed between the base of the transistor 52 and the reset terminal, no current flows through the resistor 54 when a voltage signal of LOW is applied to the reset terminal, so that the power consumption is reduced substantially to zero while the operation of the lighting device is stopped.

8. Means for Achieving an Eighth Object of the Invention

As mentioned in the article 1, the lighting device controls the brightness of the fluorescent lamp by varying the operating frequency of the switching element. When starting the fluorescent lamp, the resonant circuit disposed between the switching element and the fluorescent lamp and comprising the transformer and the capacitor is made to resonate by making the operating frequency of the switching element nearly equal to the resonance frequency of the resonant circuit. When the resonant circuit resonates, a high resonance current is produced and a high voltage appears across the electrodes of the fluorescent lamp connected to the resonant circuit to start the fluorescent lamp.

Even if the operating frequency of the switching element for varying the brightness of the fluorescent lamp fluctuates more or less due to the fluctuation of the output signal of the oscillation circuit for determining the operating frequency, the fluctuation of the brightness of the fluorescent lamp is not visually sensible. However, when starting the fluorescent lamp by applying a high voltage generated by resonance to the fluorescent lamp, the oscillation circuit must generate an output signal of an accurate frequency because resonance occurs at a frequency in a narrow range.

Although a quartz oscillator has satisfactory in the accuracy of the output frequency, the output frequency is not optionally variable because it is determined on the basis of the natural frequency of quartz. If two oscillation circuits (namely, an oscillation circuit for determining the operating frequency for varying the brightness of the fluorescent lamp and an oscillation circuit for determining the operating frequency for starting the fluorescent lamp) are employed, the start of the fluorescent lamp is ensured and the variation of the brightness of the fluorescent lamp is possible. However, since the two oscillation circuits operate asynchronously, it occurs in some cases that the duration of the ON-state of the switching element is longer than a normal duration when the mode of operation of the lighting device changes from a starting mode to a brightness control mode. If the duration of the ON-state of the switching element is longer than half the resonance period of the resonant circuit, it is possible that an overcurrent flows through the switching element and, correspondingly the switching element is destroyed or the overcurrent detector operates to stop the operation of the lighting device.

An eighth object of the present invention is to provide a lighting device for lighting the light source of a liquid crystal display, which is capable of operating at a high reliability regardless of the asynchronous operation of the two oscillation circuits.

To achieve this object, the switching elements on the high-voltage side are set in the ON-state and those on the low-voltage side are set in the OFF-state, or the former switching elements are set in the OFF-state and the latter switching elements are set in the ON-state in a time between a moment when a starting mode is changed for a steady-state lighting mode and a moment when the first polarity inversion occurs after the change of the operating mode. In such a state, the voltage applied to the resonant circuit is zero, and hence no overcurrent flows through the switching elements.

Semiconductor devices for carrying out the foregoing functions are integrated in an IC to reduce the component elements of the lighting device. The component semiconductor elements are integrated in an IC an optimum degree of integration so that the flexibility of the information processing apparatus may not be restricted. The range of the ON-resistance of the switching elements and the thermal resistance of the package containing the IC chip provided with the IC are determined properly to realize a reliable, efficient, compact information processing apparatus with a liquid crystal display.

BRIEF DESCRIPTION OF THE DRAWINGS

The above and other objects, features and advantages of the present invention will become more apparent from the following description taken in connection with the accompanying drawings, in which:

FIG. 10 shows views of a transformer to be mounted on the wiring board of the information processing apparatus of FIG. 2;

DETAILED DESCRIPTION OF THE PREFERRED EMBODIMENTS

1. First Embodiment

Figure 1:
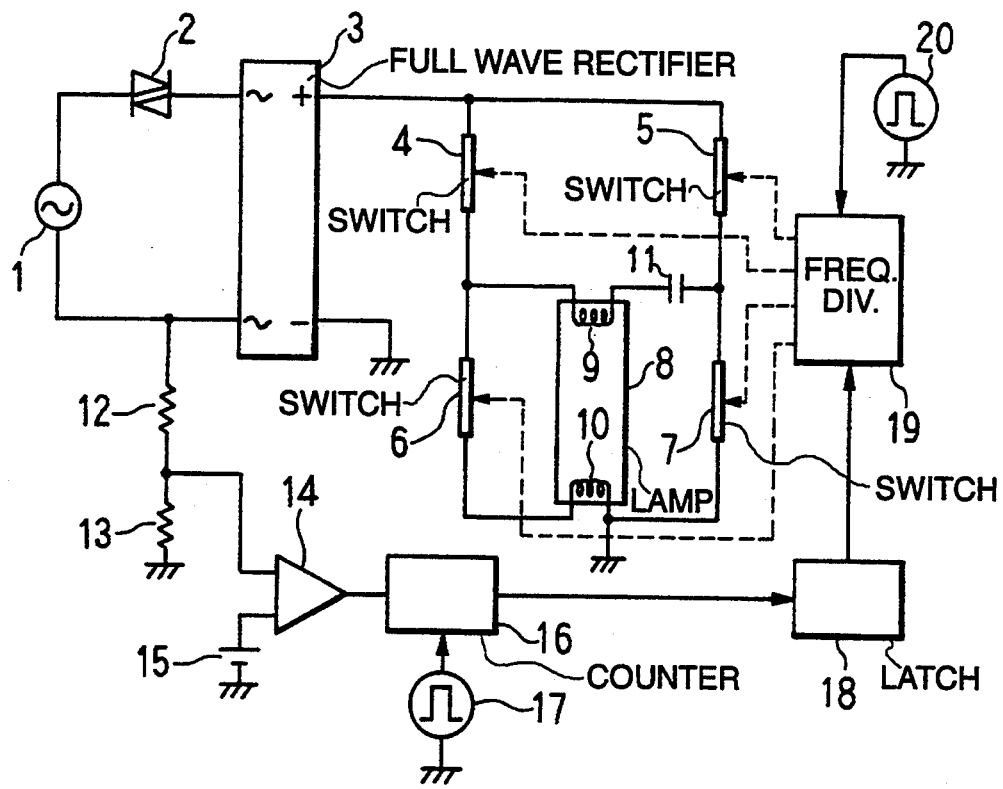
FIG. 1 is a circuit diagram of a prior art lighting device for lighting a discharge lamp.
Figure 2:
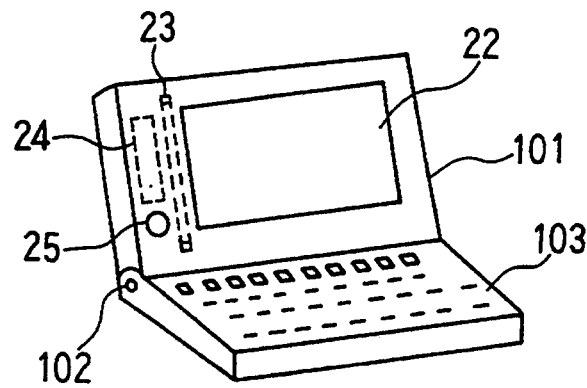
FIG. 2 is a perspective view of an information processing apparatus with a liquid crystal display.
Figure 3:
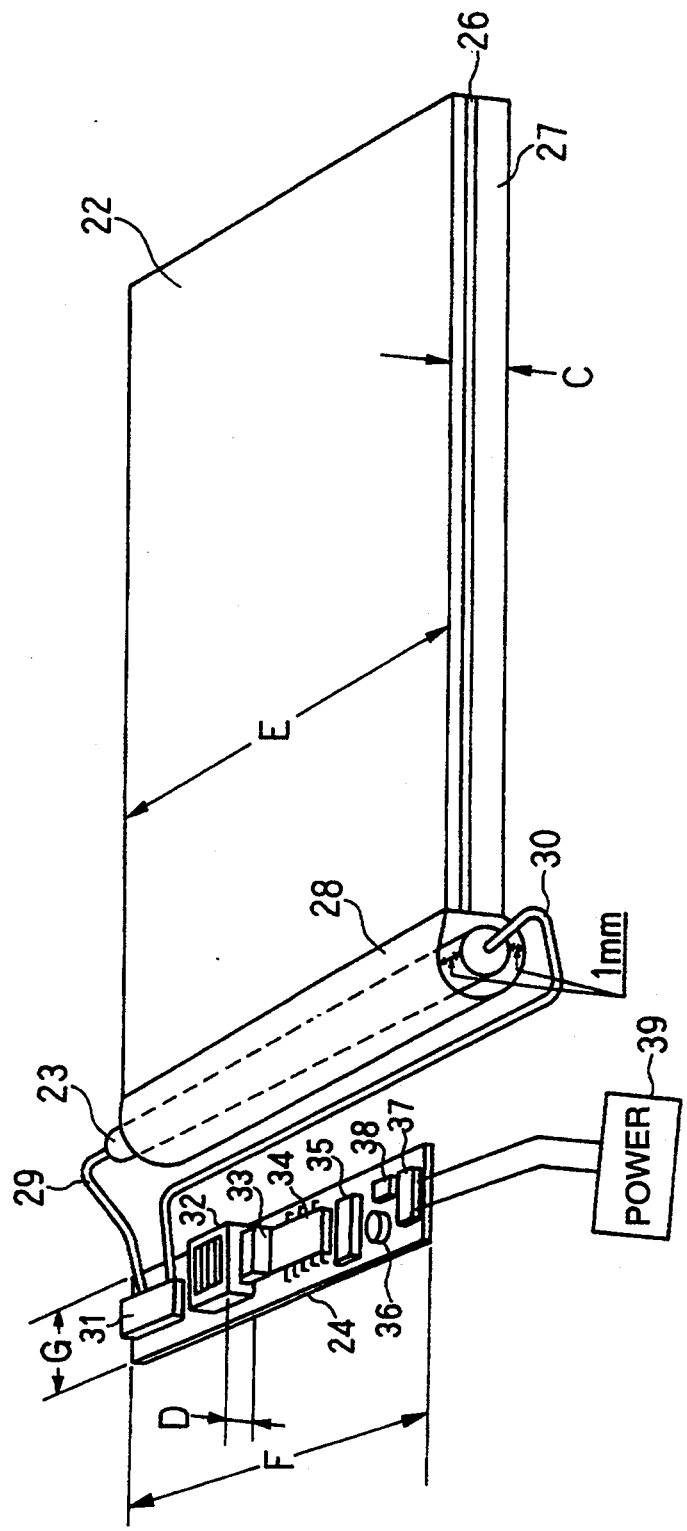
FIG. 3 is a perspective view of the liquid crystal display of the information processing apparatus of FIG. 2.
Figure 4:
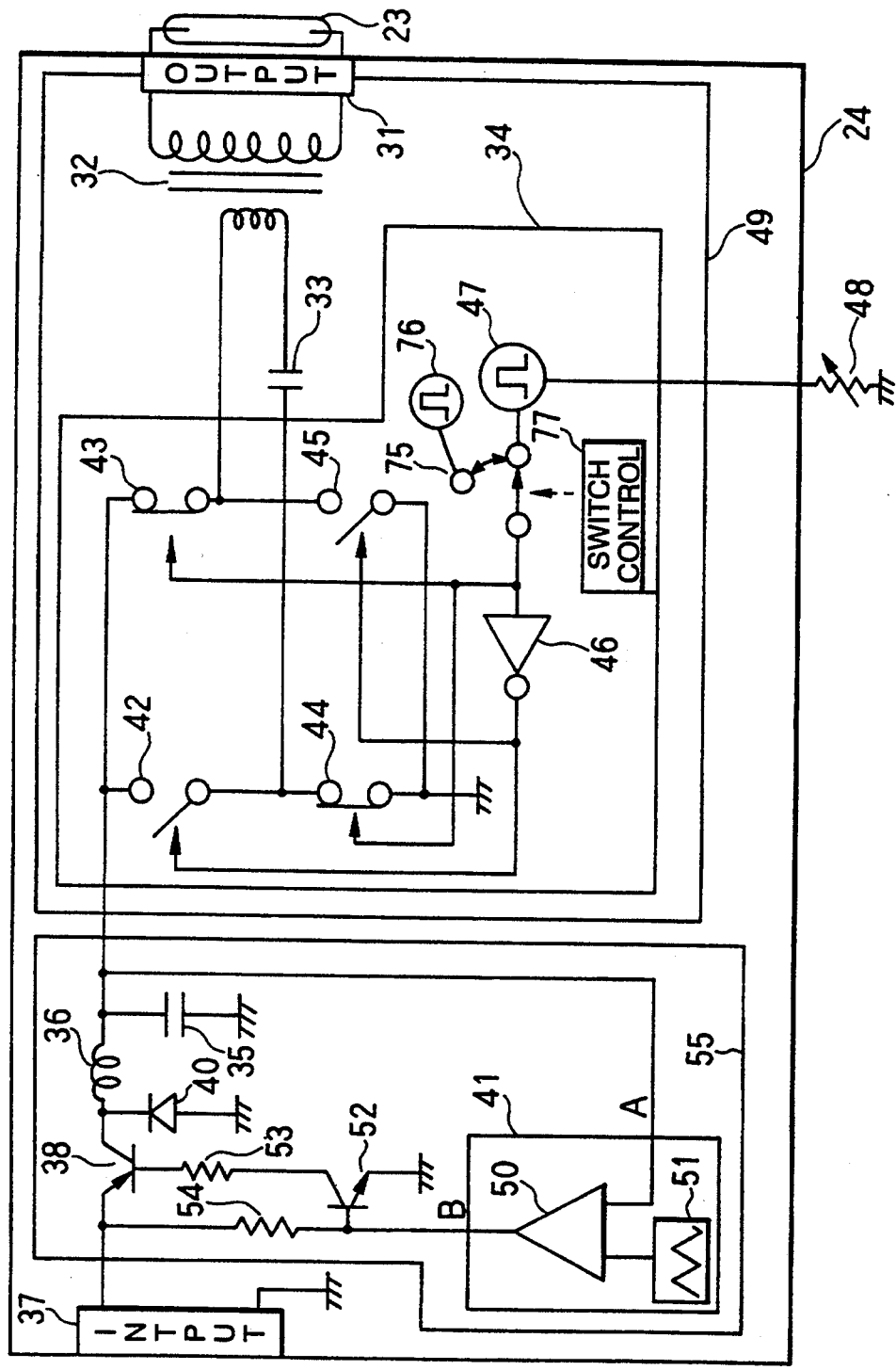
FIG. 4 is a circuit diagram of a lighting device for lighting a fluorescent lamp, having a circuit formed on a wiring board.
Figure 5:
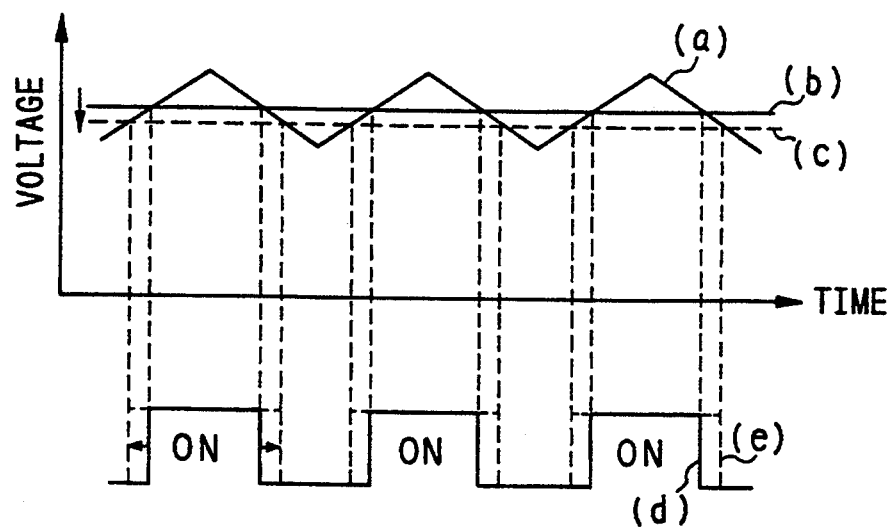
FIG. 5 is a graph to assist in explaining the operation of a pulse generator (41) included in the lighting device of FIG. 4.
Figure 6:
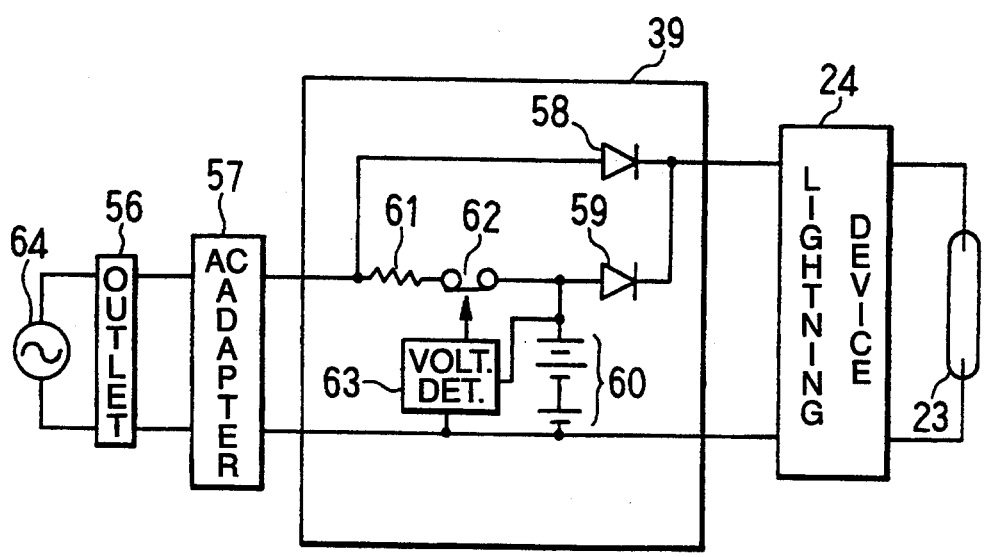
FIG. 6 is a circuit diagram of a power unit included in the information processing apparatus of FIG. 2.
Figure 7A:
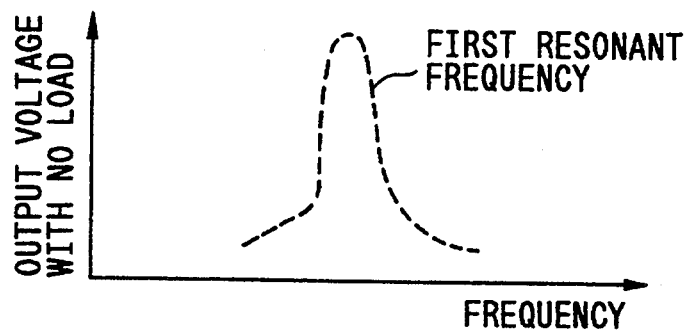
FIGS. 7(a) and 7(b) are graphs to assist in explaining the relation between the frequency of a high-frequency current supplied to the fluorescent lamp of the information processing apparatus of FIG. 2, and the voltage applied to the fluorescent lamp.
Figure 7B:
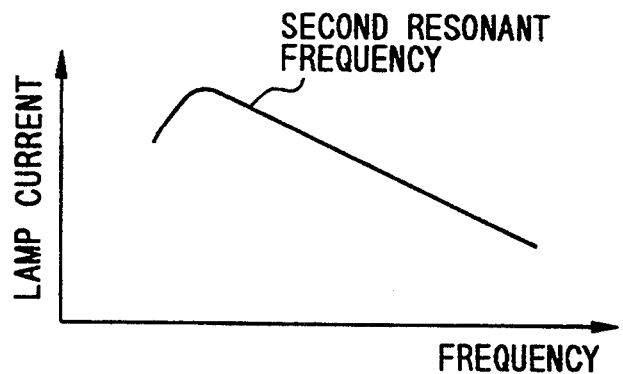

A first embodiment of the present invention will be described hereinafter with reference to FIG. 13, in which parts like or corresponding to those previously described with reference to FIG. 4 are denoted by the same reference characters.

Figure 13:
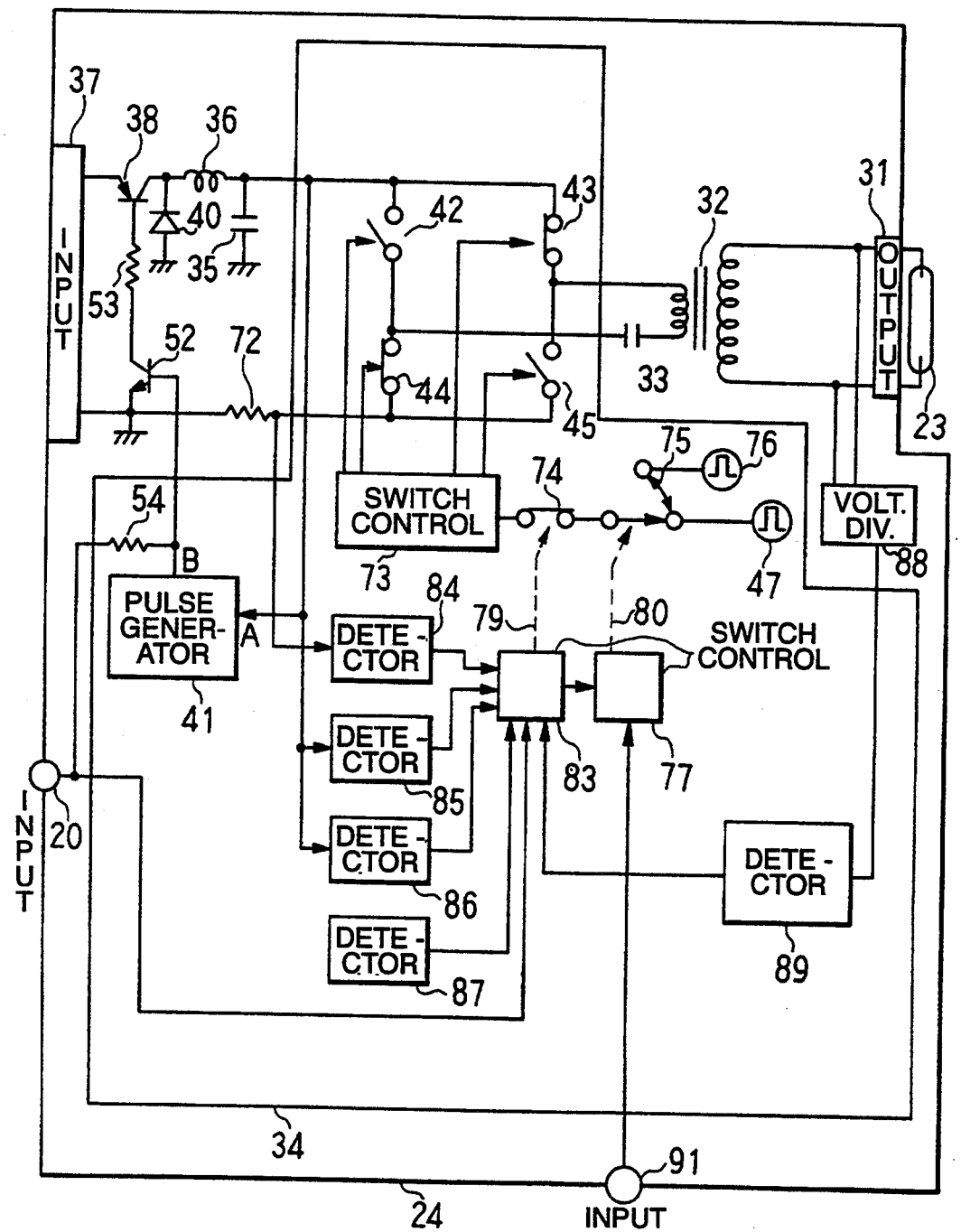
FIG. 13 is a circuit diagram of a circuit for detecting abnormal frequencies and correcting abnormal conditions, included in an information processing apparatus embodying the present invention.

Referring to FIG. 13, there are shown a current detecting resistor 72, a switching element control circuit 73 for controlling switching elements 42, 43, 44 and 45, a switch 74, a control signal 79 for controlling the switch 74, a selector switch 75, a control signal 80 for controlling the selector switch 75, a switch control circuit 83 for controlling the switch 74, an overcurrent detecting circuit 84, an overvoltage detecting circuit 85, an undervoltage detecting circuit 86, a chip temperature detecting circuit 87, a voltage dividing circuit 88, a lamp malfunction detecting circuit 89, an ON/OFF control signal input terminal 90 and a brightness control signal input terminal 91.

The basic operation for lighting a fluorescent lamp 23 is the same as that described with reference to FIG. 4. When lighting the fluorescent lamp 23, a voltage stabilized by a dc-to-dc converter comprising a chopper transistor 38, a choke coil 36 and a smoothing capacitor 35 is converted into an ac voltage by the switching action of the switching elements 42, 43, 44 and 45, and then an ac voltage is applied through a resonant circuit consisting of a transformer 32 and a capacitor 33 to the fluorescent lamp 23. The pulse generator 41 is included in an IC 34 to form the lighting device 24 by the least possible number of parts.

The frequency of a driving signal for driving the switching elements 42, 43, 44 and 45 is determined on the basis of the frequency of the output signal of a pulse generator 47 or a pulse generator 74. The selector switch 75 connects either the pulse generator 47 or the pulse generator 76 to the switching element control circuit 73. The selector switch 75 is controlled by the control signal 80 provided by the control circuit 77.

Figure 14:
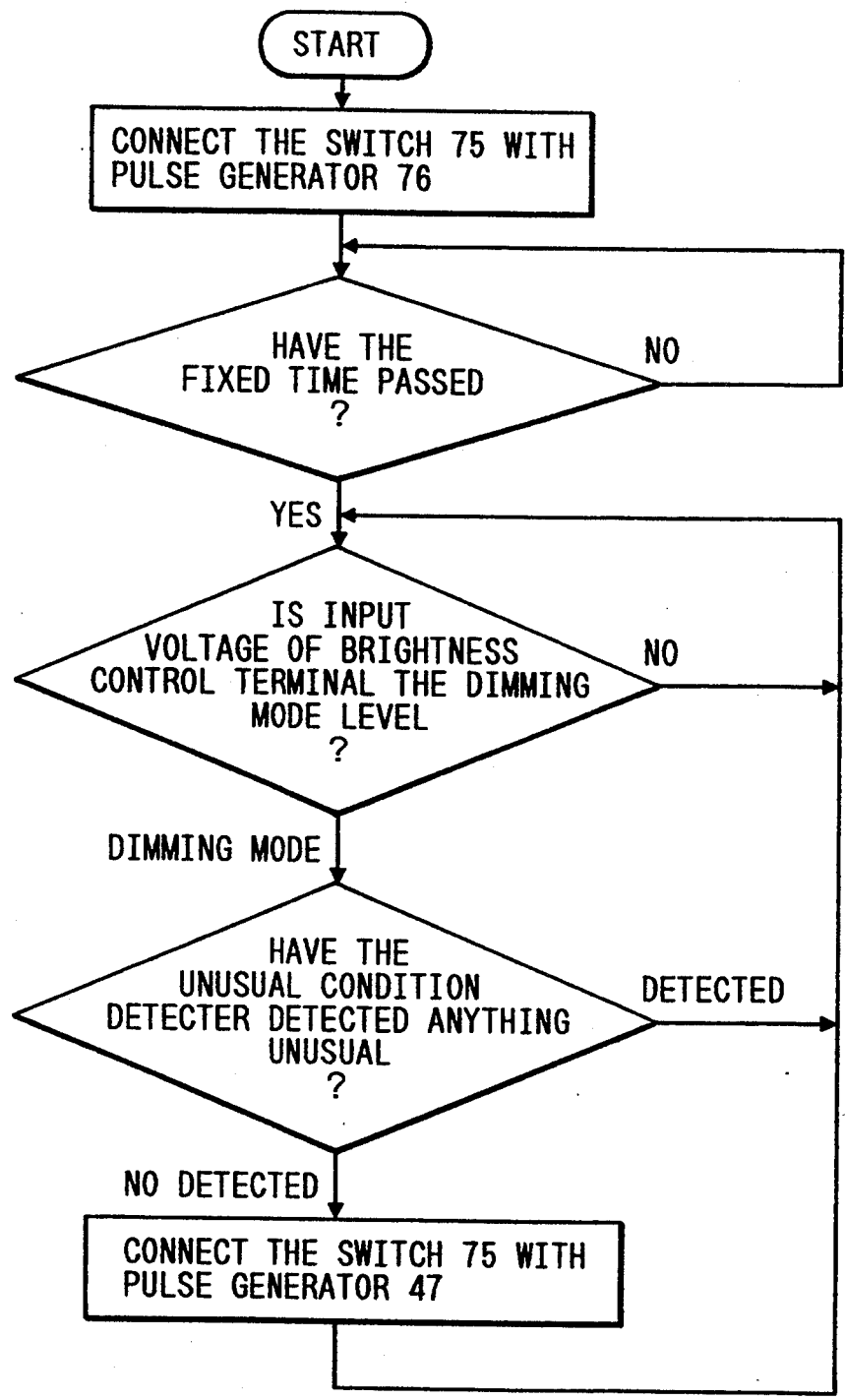
FIGS. 14 and 15 are flow charts for explaining the operation of the circuit of FIG. 13.

Referring to FIG. 14 showing the operation of the control circuit 77, first, the control circuit 77 controls the selector switch 75 to select the pulse generator 76 after the lighting device 24 has been started. A predetermined time after the selection of the pulse generator 76, a query is made to see whether a variable brightness mode signal is applied to the brightness control signal input terminal 91 to select a variable brightness mode in which the brightness of the fluorescent lamp 23 can be varied, or whether a fixed brightness mode signal is applied to the brightness control signal input terminal 91 to select a fixed brightness mode in which the brightness of the fluorescent lamp 23 is fixed at a relatively low brightness. If the fixed brightness mode signal is applied to the brightness control signal input terminal 91, the selector switch 75 remains connected to the pulse generator 76. If the variable brightness mode signal is applied to the brightness control signal input terminal 91 and any abnormal condition is detected by the overcurrent detecting circuit 84, the overvoltage detecting circuit 85, the undervoltage detecting circuit 86, the chip temperature detecting circuit 87 or the lamp malfunction detecting circuit 89, the selector switch 75 is connected to the pulse generator 47. If any abnormal condition is detected by any one of the detecting circuits 84, 85, 86, 87 and 89, the selector switch 75 is connected immediately to the pulse generator 76 to maintain a low-power operating mode. The input signal applied to the brightness control signal input terminal 91 and the output signals of the detecting circuits 84, 85, 86, 87 and 89 are monitored constantly.

Figure 15:
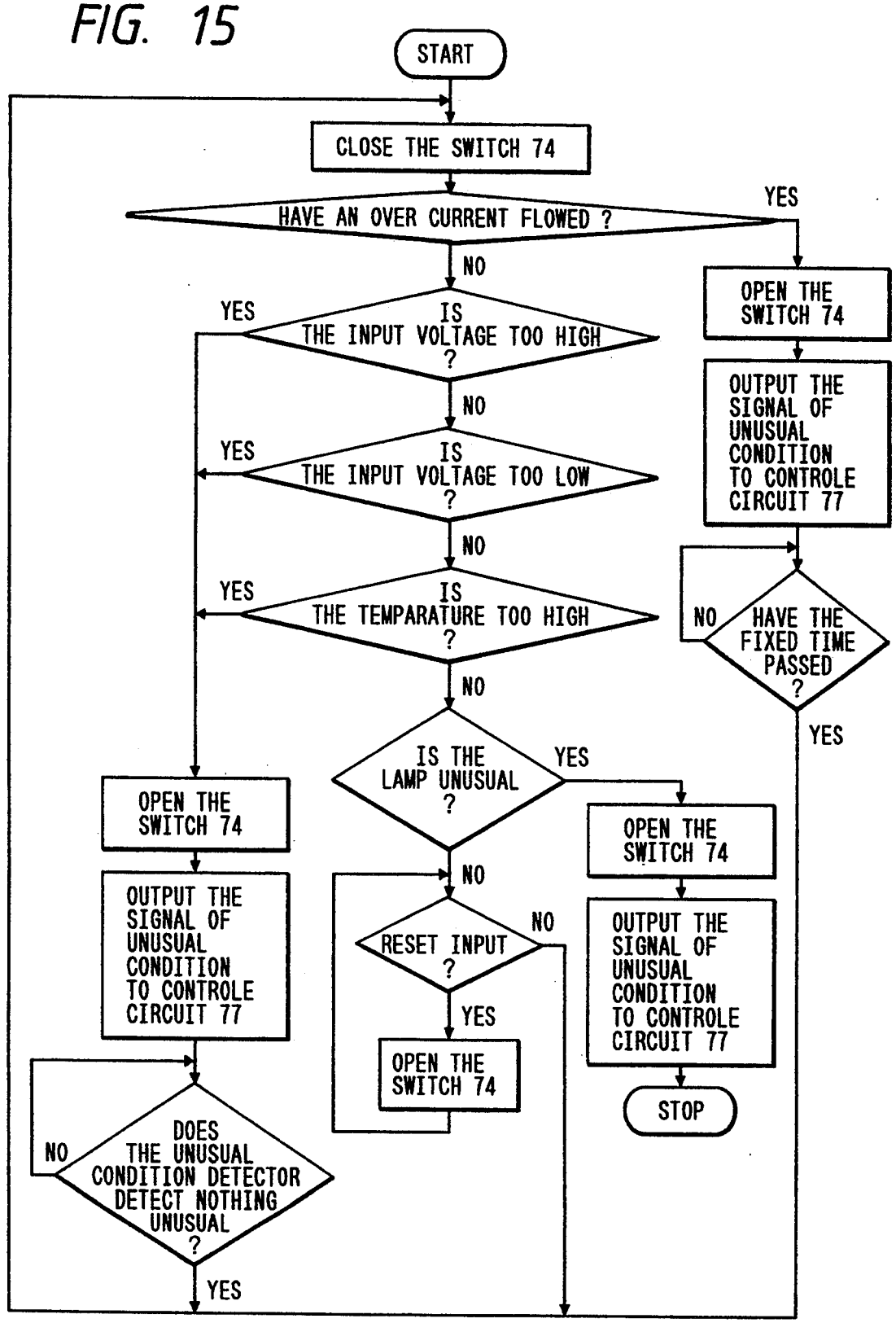

Referring to FIG. 15 showing a flow chart of an operation to be carried out by the switch control circuit 83, upon the increase of the voltage across the current detecting resistor 72 beyond a predetermined voltage, the overcurrent detecting circuit 84 gives an overcurrent signal to the switch control circuit 83. Then, the switch control circuit 83 provides a control signal 79 to open the switch 74 and sends an abnormal condition occurrence signal to the control circuit 77. The switch control circuit 83 closes the switch 74 a predetermined time after the detection of the abnormal condition.

When an abnormal condition is detected by the overvoltage detecting circuit 85, the undervoltage detecting circuit 86 or the chip temperature detecting circuit 87, the switch control circuit 83 opens the switch 74, sends an abnormal condition occurrence signal to the control circuit 77 and closes the switch 74 after the abnormal condition has been corrected.

When any abnormal condition in the fluorescent lamp 23 is detected by the lamp malfunction detecting circuit 89, the switch control circuit 83 opens the switch 74, sends an abnormal condition occurrence signal to the control circuit 77 and stops the operation of the lighting device 24.

When a reset signal is applied to the ON/OFF control signal input terminal 90, the switch control circuit 83 opens the switch 74 and holds the switch 74 open until the reset signal is removed. When the reset signal is removed, the switch control circuit 83 closes the switch 74.

2. Second Embodiment

A second embodiment of the present invention will be described with reference to FIG. 16, in which parts like or corresponding to those shown in FIG. 4 are denoted by the same reference characters. The second embodiment is intended to prevent damaging a liquid crystal display by the heat of a fluorescent lamp 23 heated due to an increase in the voltage applied to the fluorescent lamp in the last stage of the life of the fluorescent lamp.

Figure 16:
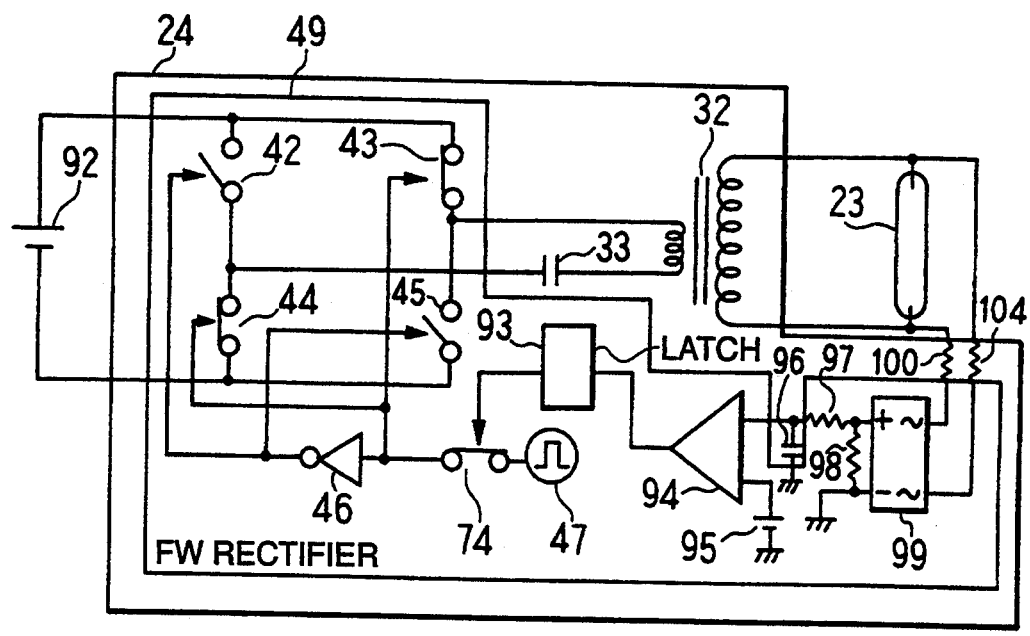
FIG. 16 is a circuit diagram of a lamp malfunction detecting circuit embodying the present invention.

Referring to FIG. 16 showing the details of the lamp malfunction detecting circuit 89 shown in FIG. 13, there are shown a dc power source 92, a switch 74, a latch 93, a voltage comparator 94, a reference voltage source 95, a delay capacitor 96, a delay resistor 97, voltage dividing resistors 98, 100 and 104, and a full-wave rectifier 99.

The terminal voltage of the fluorescent lamp 23 is converted into a dc voltage by a full-wave rectifier 99, and a voltage obtained by dividing the dc voltage by the ratio between the respective resistances of the voltage dividing resistors 100 and 104, and 98 appears across the voltage dividing resistor 98. The application of the voltage across the voltage dividing resistor 98 to the voltage comparator 94 is delayed by the delay resistor 97 and the delay capacitor 96 to avoid the false operation of the protective circuit in response to the detection of a firing potential which is higher than a normal voltage and generated when starting the fluorescent lamp 23.

When the terminal voltage of the fluorescent lamp 23 remains at a level higher than a normal level for a time longer than a predetermined time, the terminal voltage of the delay capacitor 96 increases beyond a reference voltage provided by the reference voltage source 95. Then, the output of the voltage comparator 94 is inverted and the latch 93 is inverted. While the latch 93 maintains the inverted state, the switch 74 opens to stop the operation of the switching elements 42, 43, 44 and 45 to extinguish the fluorescent lamp 23. Thus, increase of the temperature of the fluorescent lamp is prevented, so that the liquid crystal display is not damaged by the heat of the fluorescent lamp 23.

All the components of the lighting device 24, excluding the delay capacitor 96, and the voltage dividing resistors 100 and 104 to which high voltages are applied are integrated in an IC 34 to construct the lighting device by a relatively small number of parts and to enhance the reliability of the lighting device 24.

The lighting device 24 stops operation when the control signal applied to the ON/OFF control signal input terminal 90 is LOW and operates when the control signal is HIGH.

It is desirable that the lighting device 24 consumes no power while the lighting device 24 is out of operation. According to the prior art, the resistor 54 through which a driving current is supplied to the transistor 52 of the dc-to-dc converter 55 is disposed between the high-voltage side of the power source of the lighting device 24 and the base of the transistor 52. Therefore, a current flows from the power source of the lighting device 24 through the resistor 54 even if the operation of the lighting device 24 is stopped by applying a control signal of LOW to the ON/OFF control signal input terminal 90, and hence the power consumption of the lighting device 24 is not zero.

The present invention disposes the resistor 54 between the ON/OFF control signal input terminal 90 and the base of the transistor 52. Therefore, when a control signal of LOW (a voltage nearly equal to 0 V) is applied to the ON/OFF control signal input terminal 90 to stop the operation of the lighting device 24, the current flowing through the resistor 54 decreases substantially to zero, so that the power consumption of the lighting device 24 decreases substantially to zero.

3. Third Embodiment

A third embodiment of the present invention will be described hereinafter with reference to FIG. 17.

Figure 17:
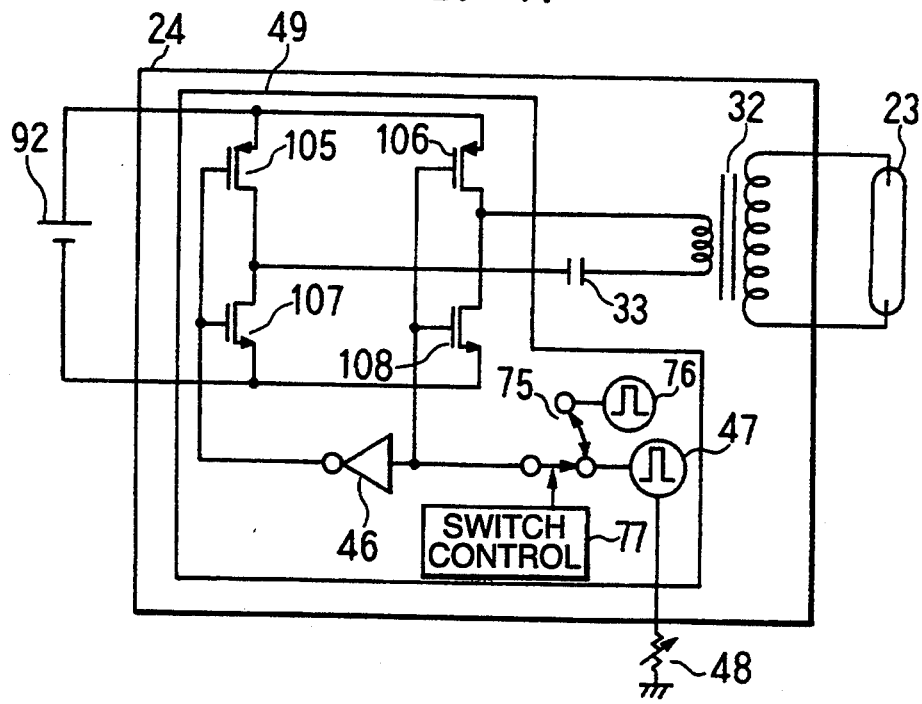
FIG. 17 is a circuit diagram of a lamp malfunction detecting circuit of another embodiment according to the present invention.

FIG. 17 shows a circuit employing MOSFETs as the switching elements, in which parts like or corresponding to those shown in FIGS. 4 and 16 are denoted by the same reference characters. In FIG. 17, switching elements 105 and 106 are p-MOSFETs, and switching elements 107 and 108 are n-MOSFETs.

The p-MOSFET goes ON when the gate potential is lower than the source potential by a predetermined voltage, and the n-MOSFET goes ON when the gate potential is higher than the source potential by a predetermined voltage. Therefore, when the MOSFETs are arranged as shown in FIG. 17, the switching elements 105 and 108 are in phase, the switching elements 106 and 107 are in phase, and the switching elements 105 and 108, and the switching elements 106 and 107 are closed and opened alternately.

4. Fourth Embodiment

A fourth embodiment of the present invention will be described hereinafter with reference to FIG. 18, in which parts like or corresponding to those previously described with reference to FIGS. 4 and 16 are denoted by the same reference characters. Basically, the operation of the circuit is similar to that of the circuit shown in FIG. 4.

In an initial state, a selector switch 75 is connected to an oscillator 76 to open and close switching elements at a frequency equal to the oscillation frequency of the oscillator 76.

When a fluorescent lamp 23 is not lighted, the resonant frequency of a resonance circuit is equal to a frequency substantially dependent on the inductance of the primary winding of a transformer 32 and the capacitance of a capacitor 33. The output voltage of this resonance system reaches a maximum owing to series resonance when the oscillation frequency of the oscillator 76 is nearly equal to the resonant frequency. Accordingly, when the oscillation frequency of the oscillator 76 is nearly equal to the resonant frequency, a high voltage is applied to the fluorescent lamp to light the fluorescent lamp 23.

After the fluorescent lamp 23 has been lighted, the resonant frequency is decreased by the influence of the leakage inductance of the transformer and, when the oscillation frequency coincides with the second resonant frequency, the input current and the output current for the fluorescent lamp 23 are highest.

Therefore, an oscillator 47 is set for an oscillation frequency substantially equal to the second resonant frequency. The brightness of the fluorescent lamp 23 can be increased to a maximum by connecting the selector switch 75 to the oscillator 47 after the fluorescent lamp 23 has been lighted. The selection of either the oscillator 47 or the oscillator 76 by the selector switch 75 is controlled by a selection signal provided by a control circuit 7.

In a state immediately after the connection of the lighting device to the power source or immediately after the operation has been started, the selector switch 75 is connected to the oscillator 76, and the oscillator 111 starts oscillating. A counter 110 counts the output signal of the oscillator 111. Upon the coincidence of the count on the counter 110 with a predetermined number, a signal is given to a logic circuit 109, and then the logic circuit 109 gives a selection signal in response to the input signal.

Generally, the respective oscillation frequencies of the oscillators 47 and 76 are not lower than audio frequencies, namely, not lower than 20,000 Hz to obviate noise and to improve the luminous efficiency of the fluorescent lamp 23. The reciprocal of the frequency is the period.

The time interval between a moment when the lighting device is connected to the power source or the operation is started, and a moment when the oscillator 76 is disconnected from the circuit and the oscillator 47 is connected to the circuit, is equal to the time necessary for discharge to be stabilized, namely, about 0.1 sec or longer. Accordingly, the count is 2,000 or greater when counted on the basis of the oscillation frequency of the oscillator 76 or 47, which requires the counter 110 of a large circuit scale.

The oscillator 111 having an oscillation frequency far smaller than those of the oscillators 47 and 76 is provided additionally to reduce a count to be counted by the counter 110 in order that the circuit scale of the counter 110 is reduced greatly to curtail the circuit scale of the general circuit. For example, a count to be counted by the counter 110 is ten or below when the oscillation frequency of the oscillator 111 is 100 Hz or below.

Since the oscillator 111 need not operate after the oscillator 76 has been disconnected from the circuit and the oscillator 47 has been connected to the circuit by the selector switch 75 a predetermined time after the connection of the lighting device to the power source, a control signal 112 is given to stop the operation of the oscillator 111 to reduce power consumption.

5. Fifth Embodiment

Figure 18:
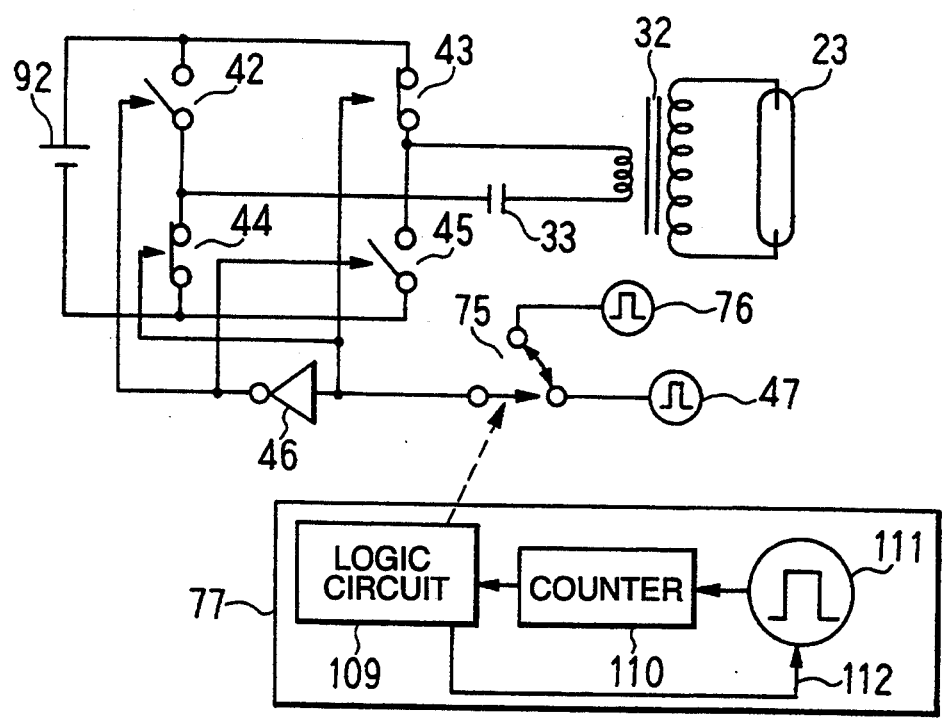
FIG. 18 is a circuit diagram of a lamp malfunction detecting circuit of still another embodiment according to the present invention.
Figure 19:
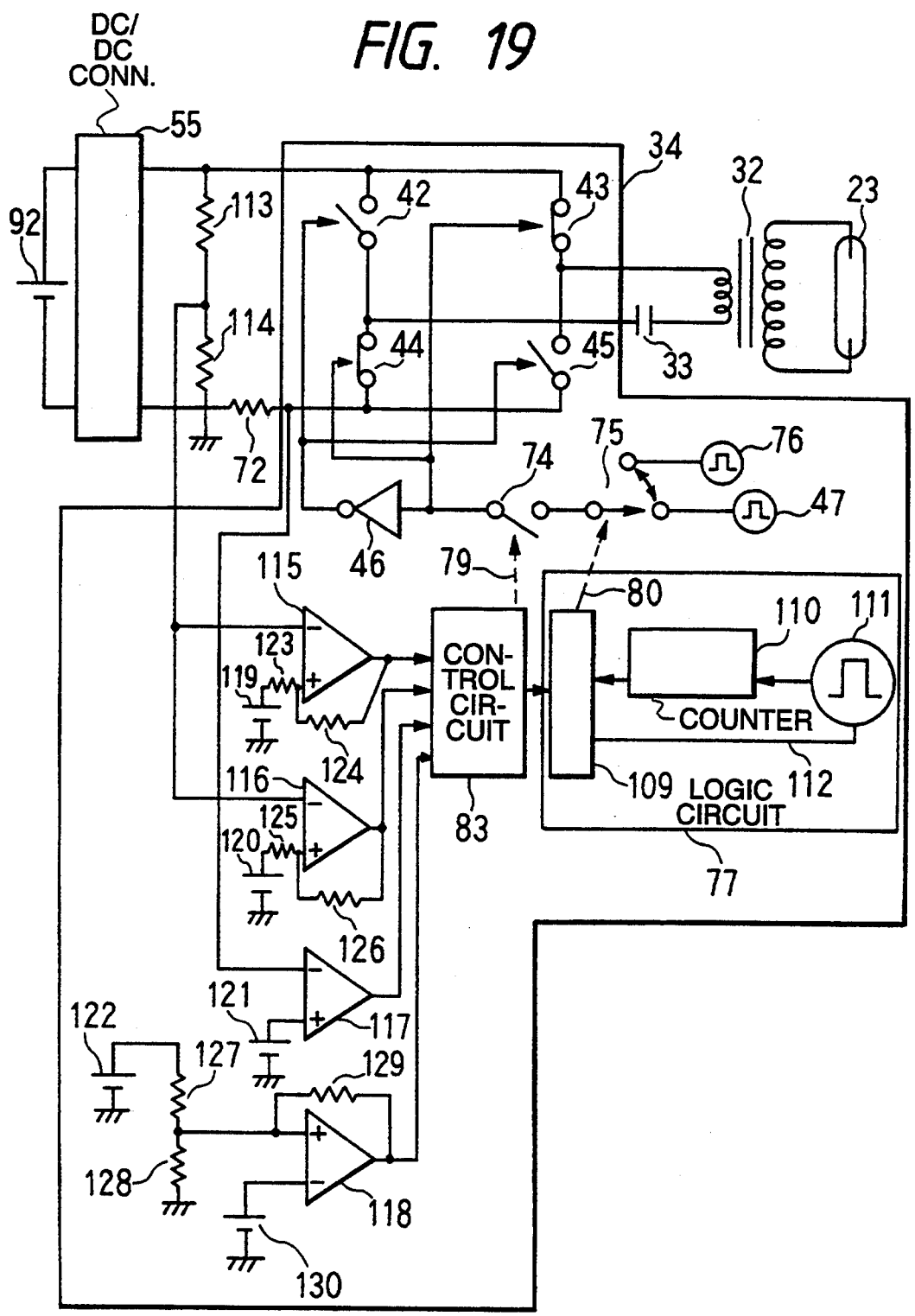
FIGS. 19, 20 and 21 are circuit diagrams of a lamp malfunction detecting circuit of still further embodiments according to the present invention.

A fifth embodiment of the present invention will be described with reference to FIG. 19, in which parts like or corresponding to those previously described with reference to FIGS. 13 and 18 are denoted by the same reference characters. FIG. 19 is a circuit diagram of assistance in explaining the circuits shown in FIG. 13 for detecting abnormal conditions.

Referring to FIG. 19, there are shown voltage dividing resistors 113 and 114 for dividing the output voltage of the dc-to-dc converter 55, voltage comparators 115, 116, 117 and 118, reference voltage sources 119, 120, 121, 122 and 130, a resistor 127, a thermistor 128 having a positive temperature coefficient of resistance, a feedback resistor 129 and hysteresis resistors 123, 124, 125 and 126.

First, the undervoltage detecting circuit will be described. If the output voltage of the dc-to-dc converter 55 drops below a predetermined voltage, the control circuits 83 and 77 malfunction, the output voltage of the inverter 46 becomes unstable, the driving voltage for driving the switching elements 42, 43, 44 and 45 becomes insufficient, and, consequently, the switching elements 42, 43, 44 and 45 malfunction. For example, if the switching elements 42 and 44 are closed simultaneously, it is possible that the switching elements are destroyed by a short-circuit current.

The undervoltage detecting circuit is provided to prevent such troubles. The undervoltage detecting circuit comprises the voltage dividing resistors 113 and 114, the reference voltage source 119, the voltage comparator 115, and the hysteresis resistors 159 and 160.

While the output voltage of the dc-to-dc converter 55 is normal, the input voltage at the minus-input terminal is higher than the input voltage at the plus-input terminal and the output of the voltage comparator 115 is LOW. This state is equivalent to the connection of the plus-input terminal of the voltage comparator 115 to 0 V. If the output voltage of the dc-to-dc converter 55 drops below the predetermined voltage, the voltage at the midpoint between the voltage dividing resistors 113 and 114 drops. Then, the input voltage at the minus-input terminal of the voltage comparator 115 drops below the input voltage at the plus-input terminal of the same and the output of the voltage comparator 115 is inverted and goes HIGH.

Upon the inversion of the output of the comparator 115, the control circuit 83 opens the switch 74 to stop the operation of the circuit. In this state, the plus-input terminal of the voltage comparator 115 is connected through the resistor 124 to the high level, and the voltage at the plus-input terminal is higher than the normal voltage. Accordingly, a voltage that appears when the voltage increases and the output of the voltage comparator 115 is LOW is lower than the voltage that appears when the output of the voltage comparator 115 is LOW. Thus, a hysteretic function is incorporated into the undervoltage detecting circuit.

The necessity of the dc-to-dc converter 55 is dependent on the purpose of the liquid crystal display. For example, in most cases where the voltage stability of the dc power source 92 is comparatively high, the dc-to-dc converter 55 is unnecessary. In most cases where the dc power source is of a relatively low voltage stability, such as a battery, the dc-to-dc converter 55 is necessary. Therefore, the input voltage of the IC 34 is detected to eliminate such troubles surely by a fixed construction whether or not the dc-to-dc converter 55 is provided.

The overvoltage detecting circuit will be described hereinafter. The overvoltage detecting circuit comprises the voltage dividing resistors 113 and 114, the reference voltage source 120, the voltage comparator 116, and the hysteresis resistors 125 and 126. While the output voltage of the dc-to-dc converter 55 is normal, the input voltage at the minus-input terminal of the voltage comparator 116 is lower than the input voltage at the plus-input terminal of the same and the output of the voltage comparator 116 is HIGH. If the output voltage of the dc-to-dc converter 55 increases beyond a predetermined voltage, the voltage at the midpoint between the voltage dividing resistors 113 and 114 increases. Consequently, the input voltage at the minus-input terminal of the voltage comparator 116 becomes higher than the input voltage at the plus-input terminal of the same, and the output of the voltage comparator 116 is inverted and goes LOW. Then, as stated above, the switch 74 is opened to stop the operation of the circuit. In this state, since the input voltage at the plus-input terminal of the voltage comparator 116 is lower than the normal input voltage, a voltage at which the output of the voltage converter 116 is inverted again and goes HIGH is lower than the voltage that appears when the output of the voltage comparator 116 is inverted and goes LOW. Thus, a hysteretic function can be incorporated into the overvoltage detecting circuit.

The overcurrent detecting circuit comprises the resistor 72, the reference voltage source 121 and the voltage comparator 117. When the current supplied to the switching elements 42, 43, 44 and 45 increases beyond a predetermined current, the voltage across the resistor 72 increases. When the voltage across the resistor 72 increases beyond a reference voltage provided by the reference voltage source 121, the output of the voltage comparator 117 is inverted and, consequently, the switch 74 is opened to stop the operation of the circuit.

The abnormal temperature rise detecting circuit comprises the voltage comparator 118, the reference voltage sources 122 and 130, the resistor 127, the thermistor 128 and the feedback resistor 129. If the ambient temperature surrounding the lighting device rises beyond a predetermined temperature, the resistance of the thermistor 128 increases, the voltage at the midpoint between the resistor 127 and the thermistor 128 increases beyond a reference voltage provided by the reference voltage source 130, and the output of the voltage converter 118 is inverted. The feedback resistor 129 is a hysteresis resistor which inhibits the restart of the operation immediately after the drop of the temperature of the lighting device when the output of the voltage comparator 118 is inverted and the operation is stopped, and allows the restart of the operation after the temperature of the lighting device has dropped further by a temperature corresponding to hysteresis caused by the feedback resistor 129.

Figure 20:
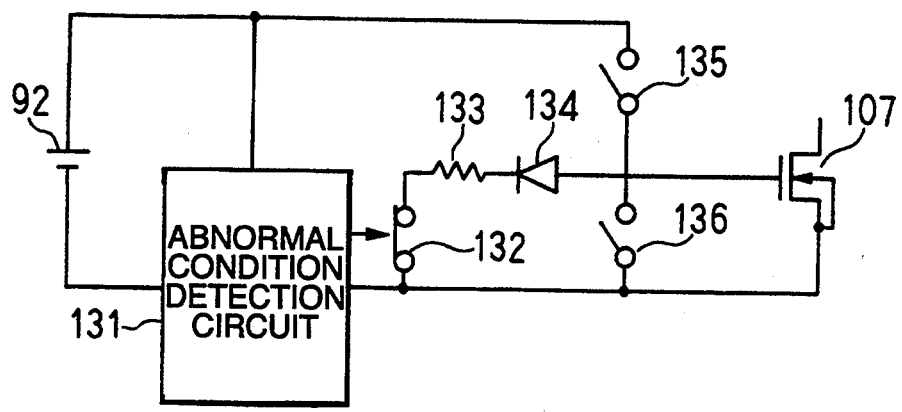

FIG. 20 shows an arrangement for surely holding the switching elements 42, 43, 44 and 45 open when such an abnormal condition is created.

In FIG. 20 there are shown a MOSFET 107, driving circuits 135 and 136 for driving the MOSFET 107, a diode 134, a resistor 133, a switch 132, and an abnormal condition detecting circuit 131 comprising the undervoltage detecting circuit, the overvoltage detecting circuit, the overcurrent detecting circuit and the excessive temperature rise detecting circuit shown in FIG. 13.

In the normal state, the switch 132 is open, and the switches 135 and 136 are closed alternately and opened alternately to drive the MOSFET 107. In case an abnormal condition as mentioned above is created, the switch 132 is closed immediately to reverse the gate bias of the MOSFET 107 through the resistor 133 and the diode 134 in order that the MOSFET 107 is held OFF without fail to prevent the malfunction of the switching elements even if the operation of the driving circuits 135 and 136 is unstable.

Figure 21:
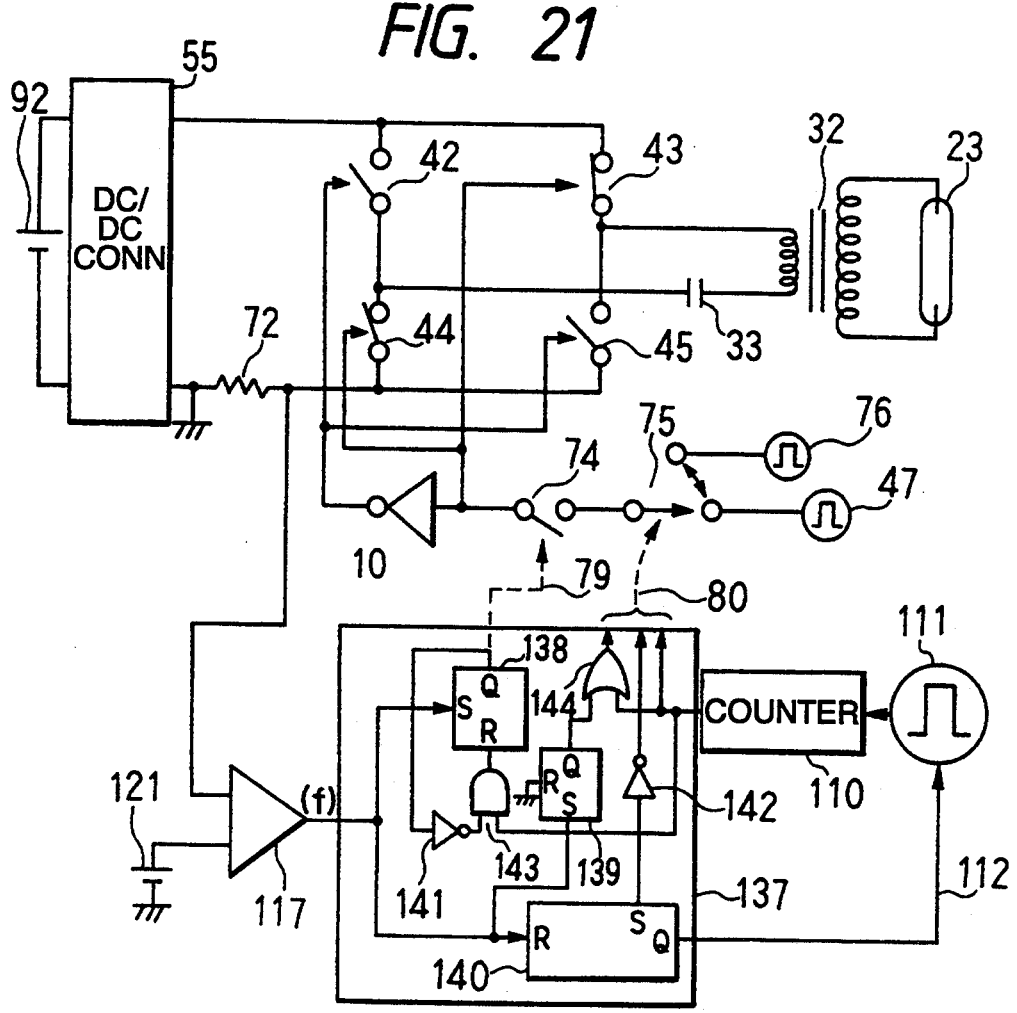

FIG. 21 shows the circuit configuration of a control circuit for restarting the operation of the circuit a predetermined time after the operation of the circuit has been stopped by the action of the overcurrent detecting circuit previously described with reference to FIG. 13. In FIG. 21, parts like or corresponding to those previously described with reference to FIGS. 13 and 19 are denoted by the same reference characters.

In FIG. 21 indicated at is a control circuit comprising an OR gate 144, latch circuits 138, 139 and 140, AND gate 143 and inverters 141 and 142.

Figure 22:
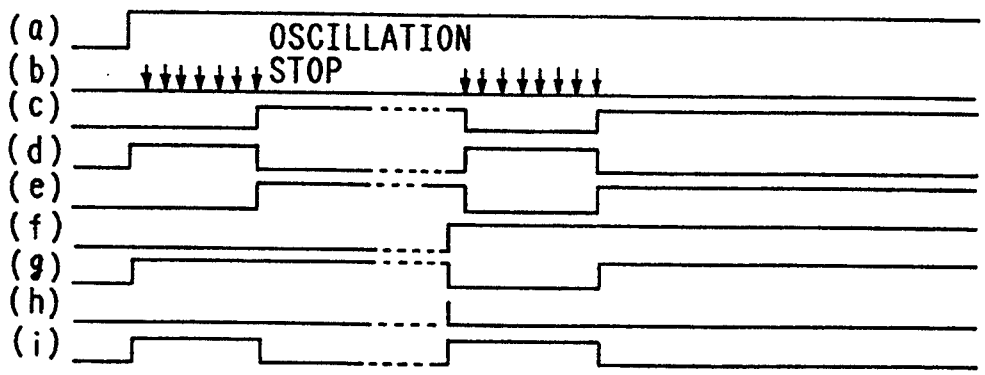
FIG. 22 is a diagram showing the waveforms of signals used by the circuit of FIG. 21.

FIG. 22 shows the respective waveforms representing the operation of the components of the circuits shown in FIG. 21. In FIG. 22, a curve (a) represents the waveform of the output voltage of the dc-to-dc converter 55, a curve (b) represents the waveform of the output voltage of the oscillation circuit 111, a curve (c) represents the waveform of the output voltage of the counter 110, and curves (d), (e) and (f) represent switch control signals 80 provided by the control circuit 137.

When the switch control signal 80 represented by the curve (d) is HIGH, the oscillator 76 is connected to the circuit and the switching elements are controlled so as to operate at the starting frequency. When the switch control signal 80 represented by the curve (e) is HIGH, the oscillator 47 is connected to the circuit and the switching elements are controlled for steady-state lighting operation. When the switch control signal 80 represented by the curve (f) is HIGH, the oscillator 76 is connected to the circuit. The first priority is given to the control signal 80 represented by the curve (f) among the control signals represented by the curves (d), (e) and (f).

A curve (g) represents the waveform of the control signal 79 for controlling the switch 74. The switch 74 is closed when the control signal 79 is HIGH. A curve (h) represents the waveform of the output voltage of the voltage comparator 117 for overcurrent detection. A curve (i) represents the waveform of a control signal 112 for controlling the oscillator 111. The oscillator 111 operates when the control signal 112 is HIGH.

The latch circuits 138 and 140 are RS latches (reset-set latches). In these latch circuits 138 and 140, the output is LOW when a signal at the input S is HIGH and a signal at the input R is LOW, the output is HIGH when a signal at the input S is LOW and a signal at the input R is HIGH, no change occurs at the output when both the signals at the inputs R and S are LOW, and the output is LOW when both the signals at the inputs R and S are HIGH. It is assumed that the outputs of the latch circuits 138 and 140 are HIGH in the initial state, namely, a state immediately after the connection of the lighting device to the light source.

The latch circuit 139 also is a RS latch. In the latch circuit 139, the output is HIGH when the signal at the input S is HIGH and the signal at the input R is LOW, the output is LOW when the signal at the input S is LOW and the signal at the input R is HIGH, no change occurs at the output when both the signals at the inputs R and S are LOW, and the output is HIGH when both the signals at the inputs R and S are HIGH. It is assumed that the output is LOW in the initial state immediately after the connection of the lighting device to the power source.

Upon the connection of the lighting device to the power source, the switch 74 is closed, the selector switch 75 connects the oscillator 76 to the circuit, and the oscillator 111 begins operation. The starting operation continues until the count on the counter 110 for counting the output signal of the oscillator 111 reaches a predetermined number. Upon the coincidence of the count on the counter 110 with the predetermined number, the output of the counter 110 goes HIGH (the curve (c)). Then, output of the latch circuit 140 goes LOW (the curve (i)) and thereby the operation of the oscillator 111 is stopped. In this state, the output of the counter 110 remains HIGH. Since the output of the latch circuit 138 is HIGH in this state, the output of the AND gate 143 remains LOW.

At the same time, the switch control signals changes as indicated by the curves (d), (e) and (f) to disconnect the oscillator 76 from the circuit and to connect the oscillator 47 to the circuit for the steady-state lighting operation. If an abnormal condition, such as short-circuiting, occurs, an overcurrent flows through the resistor 72 and the output of the voltage comparator 117 is inverted. When the protective circuit functions in a manner similar to that described previously, the operation of the switching elements is stopped immediately. Although the output of the voltage comparator 117 is inverted only for a moment as indicated by the curve (h), the output of the voltage comparator 117 is latched by the latch circuits 138, 139 and 140. Consequently, the switch 74 is opened to stop the operation of the lighting device, the oscillator 111 is restarted and the counter 110 starts counting the output of the oscillator 111 as indicated by the curves (g) and (i).

At the same time, the signal represented by the curve (f) goes HIGH to connect the oscillator 76 to the circuit. This state is maintained until the count on the counter 110 coincides with the predetermined number. Upon the coincidence of the count with the predetermined number, the latch circuit 138 is reset and the switch 74 is closed to restart the lighting device, and then the lighting device operates at the starting frequency. If the abnormal condition, such as short-circuiting, has been corrected before the lighting device is restarted, the fluorescent lamp 23 is lighted without fail. If the abnormal condition has not been corrected, the foregoing procedure is repeated.

As explained with reference to FIGS. 13 and 21, the switching elements 42, 43, 44 and 45 operate according to the output of the oscillator 76 in the initial stage of operation after the connection of the lighting device to the power source, and then a fixed time after the connection of the lighting device to the power source, the switching elements 42, 43, 44 and 45 start operating according to the output of the oscillator 47. The waveforms of signals used when changing the oscillator 76 to the oscillator 47 are shown in FIG. 23.

Figure 23:
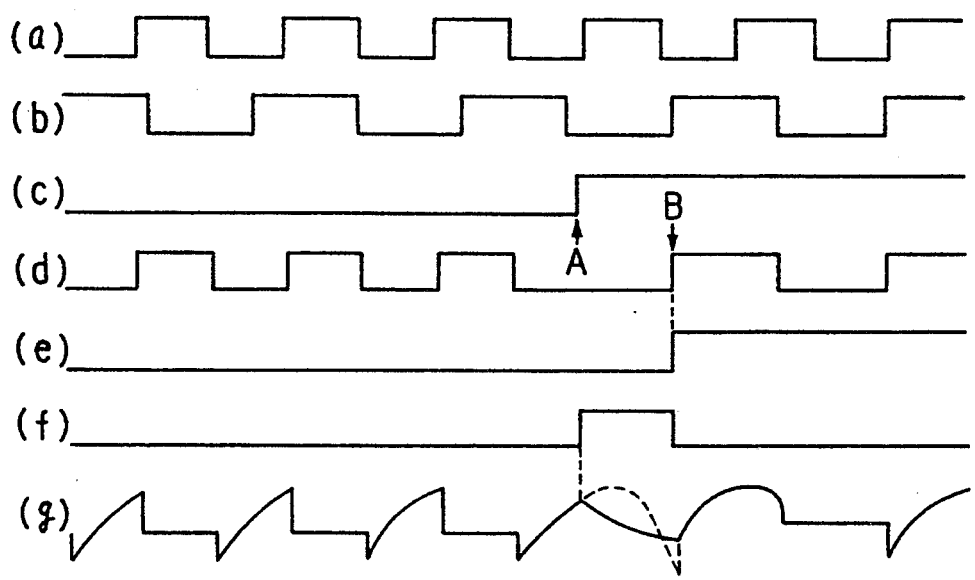
FIG. 23 is a diagram showing the waveforms of output signals of a dc-to-dc converter and the associated parts.

In FIG. 23, a curve (a) represents the waveform of the output voltage of the oscillator 76, a curve (b) represents the waveform of the output voltage of the oscillator 47, a curve (c) represents the waveform of the control signal 80 and a curve (d) represents the waveform of the voltage at the midpoint between the switching elements 42 and 44. It is known from the curve (d) that the switching element 44 is in an ON state when the voltage is on a low level and the switching element 42 is in an ON state when the voltage is on a high level.

As is evident from the curve (d), it is possible, depending on the time when the control signal 80 is provided, that the duration of the ON state of the switching element 44 is longer than the period of operation of the switching elements 42, 43, 44 and 45 for applying the maximum voltage, because the operation of the oscillators 76 and 47 is asynchronous. As is generally known, when the switching element 44 operates in a phase advancing mode, a current indicated by a broken line in a curve (g) of FIG. 23 flows through the switching element 44 and a through current flows from the dc power source 92 to the switching elements 42 and 44 and, in the worst case, the switching elements are destroyed.

To prevent such a result, the switching elements 42 and 43 are held in an OFF state and the switching elements 44 and 45 are held in an ON state in a period between a moment when the control signal 80 is provided and a moment when the respective states of the switching elements 42, 43, 44 and 45 are changed for the first time. Consequently, the voltage across the terminals connected to the primary winding of the transformer 32 and capacitor 33 connected in series to the primary winding is reduced to about 0 V and the waveform of the current flowing through the switching element 44 changes into a waveform indicated by continuous lines in the curve (g) of FIG. 23. Accordingly, the switching element 44 does not operate in a phase advancing mode, which enhances the reliability of the lighting device.

The same effect is obtained by holding the switching elements 42 and 43 in an ON state and holding the switching elements 44 and 45 in an OFF state. Such a control mode can be realized by a circuit shown in FIG. 24, in which parts like or corresponding to those shown in FIG. 18 are denoted by the same reference characters.

Figure 24:
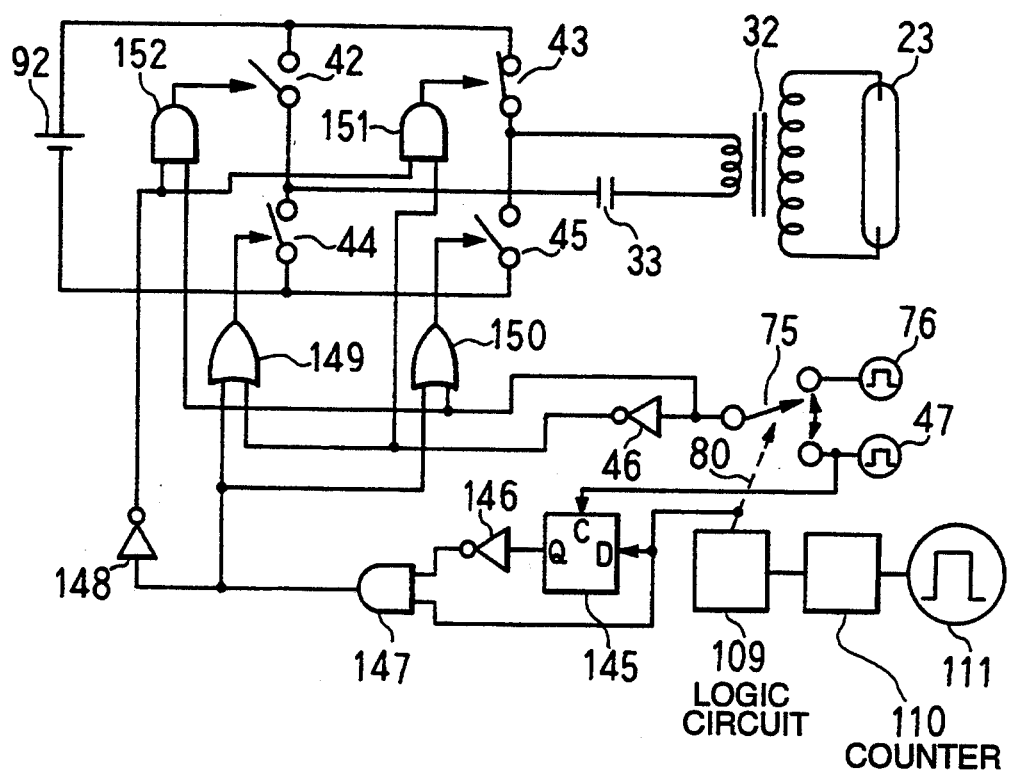
FIG. 24 is a circuit diagram of a circuit for changing the oscillation frequency of a fluorescent lamp.

In FIG. 24, there are shown a D flip flop 145 in which the transfer of a signal applied to the input terminal D thereof to the output terminal Q thereof is delayed so that the signal applied to the input terminal D appears at the output terminal Q when a clock signal is applied to the input terminal C thereof, inverters 146 and 148, AND gates 147, 151 and 152 and OR gates 149 and 150.

During a period between a moment when the control signal 80 is provided to change the position of the switch 75 and a moment when the respective states of the switching elements 42, 43, 44 and 45 are changed for the first time, the switching elements 42 and 43 are held in an OFF state and the switching elements 44 and 45 are held in an ON state. Thus, the phase advancing mode is avoided to prevent destroying the lighting device. To hold the switching elements 42, 43, 44 and 45 in such states, the transfer of the control signal 80 is delayed by the D flip flop 145 until the next inversion of the waveform of the output voltage of the oscillator 47 as shown by the curve (e) in FIG. 23. The AND gate 147 carries out the logical AND operation between a signal obtained by inverting the output signal of the D flip flop 145 by the inverter 146 and the control signal 80 represented by the curve (c) in FIG. 23 and provides an output signal represented by the curve (f) shown in FIG. 23.

The output signal of the AND gate 147 having the waveform represented by the curve (f) shown in FIG. 23 is applied directly to one of the input terminals of the OR gate 149 and to one of the input terminals of the OR gate 150, and the respective output signals of the OR gates 149 and 150 are HIGH while the output signal of the AND gate 147 represented by the curve (f) is HIGH regardless of the level of the other input terminals, so that the switching elements 44 and 45 go ON.

A signal obtained by inverting the output signal of the AND gate 147 represented by the curve (f) by the inverter 148 is applied to one of the input terminals of the AND gate 151 and to one of the input terminals of the AND gate 152. Then, the output signals of the AND gates 151 and 152 are LOW while the signal represented by the curve (f) is HIGH regardless of the level of the other input terminals, so that the switching elements 44 and 45 go OFF. Thus, the foregoing trouble can be prevented.

Figure 25:
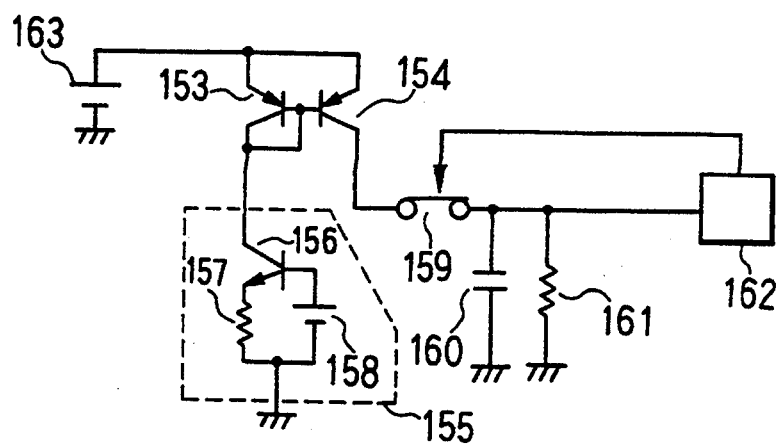
FIG. 25 is a circuit diagram of the oscillator 76 of FIG. 4 and the associated circuits.

FIG. 25 shows the circuit configuration of the oscillator 76 or 47 shown in FIG. 4. Shown in FIG. 25 are a dc power source 163, transistors 153 and 154 forming a current mirror, a constant-current regulated power supply 155 comprising a constant-voltage regulated power supply 158, a transistor 156 and a resistor 157, a switch 159, a capacitor 160, a resistor 161, and a control circuit 162 for controlling the switch 159.

Figure 26:
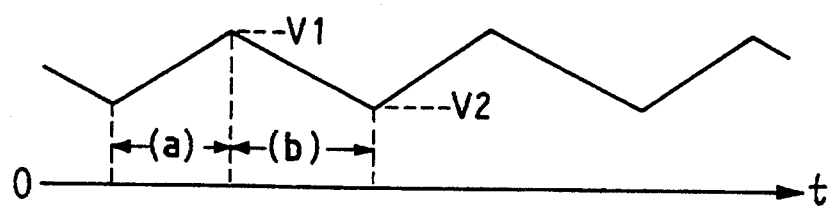
FIG. 26 is a diagram to assist in explaining the oscillator of FIG. 25.

The operation of the oscillator 76 or 47 shown in FIG. 25 will be described briefly with reference to FIG. 26 showing the waveform of the voltage across the capacitor 160.

Referring to FIG. 26, the switch 159 is closed in a period (a) to charge the capacitor 160 through the transistor 154 and the switch 159. The charging current supplied to the capacitor 160 is controlled so as to be proportional to the current supplied by the constant-current regulated power supply 155 by the current mirror consisting of the transistors 153 and 154. Accordingly, the frequency of the output signal of the oscillator can be regulated by changing the charging time required for charging the capacitor 160 by the output current of the constant-current regulated power supply 155 by varying the resistance of the resistor 157.

The switch 159 is open in a period (b) of FIG. 26 to discharge the capacitor 160 through the resistor 161. Since the time required for discharging the capacitor 160 varies according to the resistance of the resistor 161, the resistor 161 can be used for regulating the frequency.

As shown in FIG. 26, the control circuit 162 opens the switch 159 upon the increase of the voltage across the capacitor 160 toga voltage V1 and closes the switch 159 upon the decrease of the same to a voltage V2.

Figure 27:
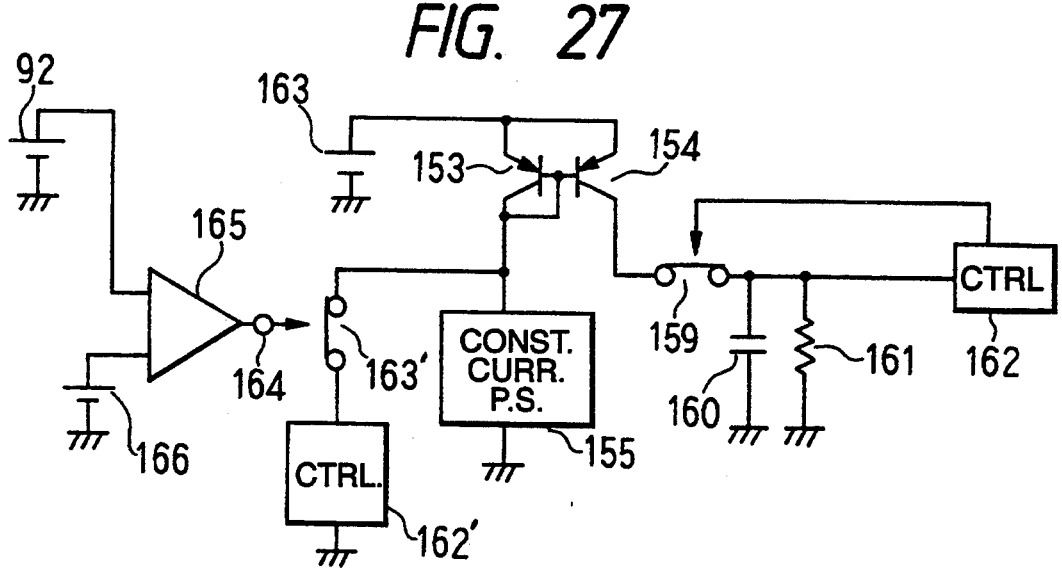
FIG. 27 is a circuit diagram of a circuit used in the fifth embodiment according to the present invention.

The brightness of the fluorescent lamp 23 may be regulated by a circuit shown in FIG. 27. The circuit shown in FIG. 27 has a constant-current regulated power supply 155, which is the same as the constant-current regulated power supply 155 of FIG. 25, and a current source 162 having the same circuit configuration as that of the constant-current regulated power supply 155. The current source 162 is connected through a switch 163 in parallel to the constant-current regulated power supply 155 to supply the sum of currents supplied from a plurality of current sources to a transistor 153 forming a current mirror. The switch 163 is controlled by a control signal that appears at a control terminal 164 to change the number of the current sources to be connected to the transistor 153 so that the frequency is varied for regulating the brightness of the fluorescent lamp 23.

Constructed in a compact, thin construction, the information processing apparatus of the present invention is portable and capable of using a secondary battery as a power source. When a commercial power source is available, the information processing apparatus is connected through an ac adapter to the commercial power source. When the information processing apparatus is connected to a commercial power source, the secondary battery of the information processing apparatus is charged while the same is in operation.

When charging the secondary battery, a voltage in the range of 1.5 times to twice the terminal voltage of the secondary battery is applied to the secondary battery. The output voltage of the dc power source 92 is equal to the terminal voltage of the secondary battery when the information processing apparatus is not connected to a commercial power supply. When the information processing apparatus is connected through the ac adapter to a commercial power source, the output voltage of the dc power source is equal to the charging voltage. Accordingly, it is known from the detection of the output voltage of the dc power source 92 whether the information processing apparatus is powered by a commercial power source or whether the same is powered by the secondary battery.

In FIG. 27, indicated at 165 is a voltage comparator and at 166 is a reference voltage source. The voltage comparator 165 compares the output voltage of the dc power source 92 and a reference voltage provided by the reference voltage source 166. If the output voltage of the dc power source 92 is lower than a predetermined voltage, it is decided that the information processing apparatus is not connected to a commercial power source. When the information processing apparatus is not connected to a commercial power source, the switch 163 is closed to increase the charging current for charging the capacitor 160, so that the operating frequency is increased to reduce the current to be supplied to the fluorescent lamp 23, whereby the power consumption of the information processing apparatus is reduced and the life of the secondary battery is extended.

When the output voltage of the dc power source 92 is higher than a predetermined voltage, it is decided that the information processing apparatus is powered by a commercial power source. In this case, the switch 163 is opened to reduce the charging current for charging the capacitor 160 so that the operating frequency is increased. Thus, the current to be supplied to the fluorescent lamp 23 is increased to enhance the luminance of the screen of the liquid crystal display to give priority to the visibility of the screen rather than to the reduction of power consumption.

A control signal provided by an external circuit or produced by an internal software program may be applied to the output terminal 164 of the voltage comparator to operate the switch 163 forcibly.

Incidentally, the thermal resistance between the IC chip provided with the IC 34 and the atmosphere is greatly dependent on the size of the package (FIGS. 8 and 9) containing the IC chip. Since the surface area of the package increases with an increase in the size of the package, the thermal resistance is smaller when the package is greater. When the thermal resistance is relatively small, the rise of the temperature of the IC chip is relatively small even if the power consumption is large. Accordingly, a sufficiently high reliability of the IC chip can be secured even for a relatively high ON resistance of the switching elements 42, 43, 44 and 45 through which power is supplied to the fluorescent lamp 23 (FIG. 4), when the IC chip is contained in a relatively large package.

Figure 8:
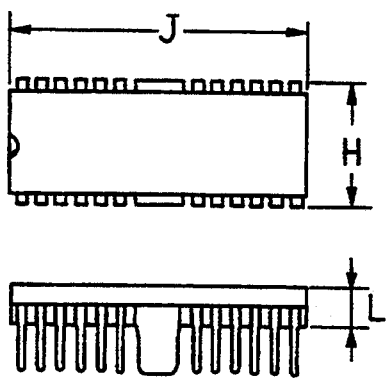
FIG. 8 shows views of an IC package to be mounted on the wiring board of the information processing apparatus of FIG. 2.
Figure 9:
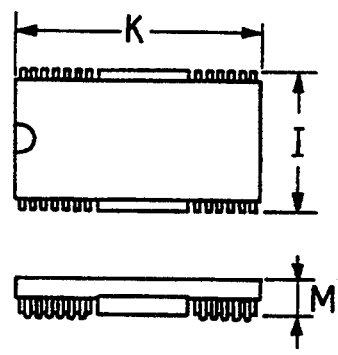
FIG. 9 shows views of an IC package to be mounted on the wiring board of the information processing apparatus of FIG. 2.
Figure 11:
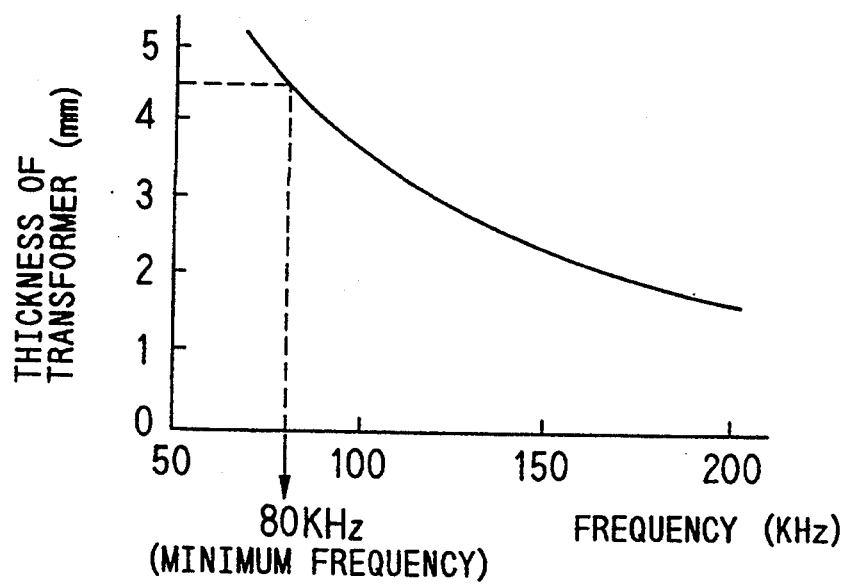
FIG. 11 is a graph showing the relation between the lower limit thickness of the transformer of FIG. 10 and the operating frequency of an oscillation circuit.
Figure 12:
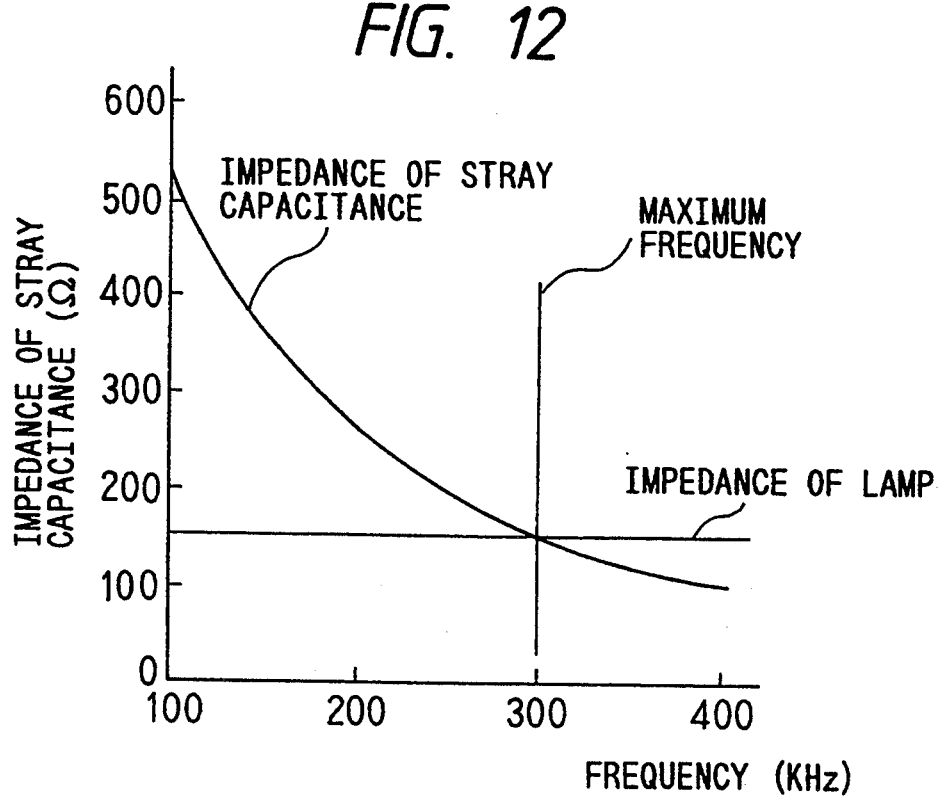
FIG. 12 is a graph to assist in explaining a method of determining the upper limit frequency of high-frequency power to be supplied to the fluorescent lamp of the information processing apparatus of FIG. 2.

However, as mentioned above, the package is subject to dimensional restrictions. For example, a semiconductor device available on the market is subject to the dimensional restrictions as shown in FIGS. 8 and 9. Concretely, the sizes J and K must be equal to or smaller than about 20 mm, the sizes H and I must be equal to or smaller than about 11 mm and the sizes L and M must be equal to or smaller than about 3 mm. The thermal resistance of a package meeting those dimensional restrictions and mounted on a glass-epoxy wiring board or a paper-phenol wiring board is about 60° C./W.

Generally, the working temperature of such an IC chip is not higher than about 100° C. The temperature of the ambience surrounding the lighting device of the information processing apparatus increases to about 50° C. Accordingly, the difference between the working temperature and the ambient temperature is about 50° C. and hence the power consumption of the IC chip must be 0.8 W or below.

Most of the power supplied to the IC chip is consumed by the switching elements 42, 43, 44 and 45. Therefore, the power consumption of the IC chip is substantially equal to the product of $R_{ON}$ and the square of $I_{IN}'$, where $R_{ON}$ is the mean of the respective ON resistances of the switching elements 42, 43, 44 and 45, and $I_{IN}$ is the maximum supply current supplied to the lighting device. Thus, the product $R_{ON} \times I_{IN}^2$ must be 0.8 W or below.

Measures to deal with the increase in the ON resistances of the switching elements 42, 43, 44 and 45 due to the drop of the output voltage of the dc power source 92 to a voltage not high enough to drive the switching elements 42, 43, 44 and 45 will be described hereinafter with reference to FIG. 28, which shows a boosting circuit.

Figure 28:
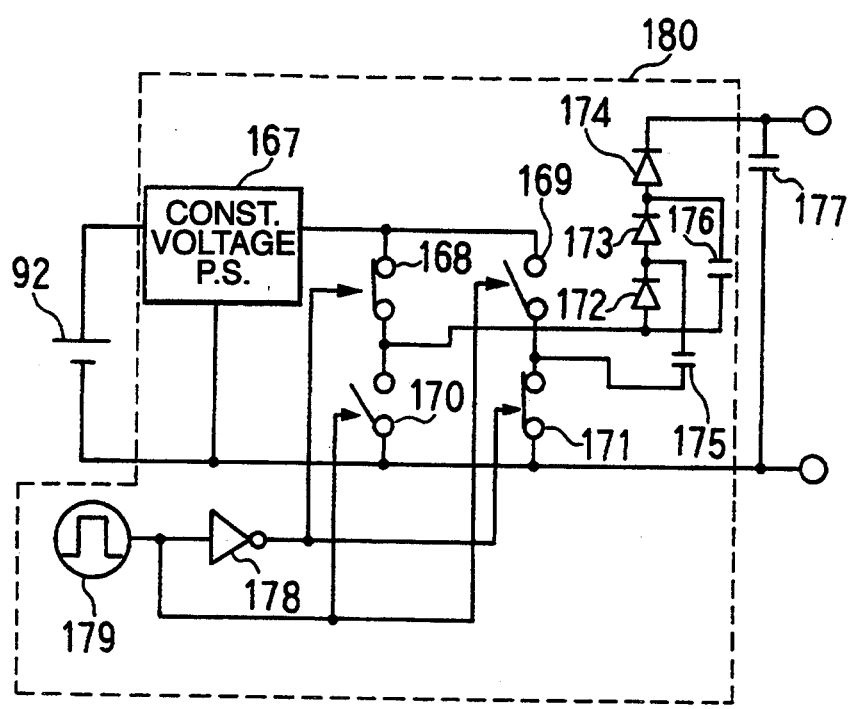
FIG. 28 is a circuit diagram of a boosting circuit included in the information processing apparatus embodying the present invention.

The output voltage of a boosting circuit 180 shown in FIG. 28 is about an integral multiple of the output voltage of the dc power source 92. Shown in FIG. 28 are a constant-voltage regulated power supply 167, such as a three-terminal voltage regulator, an oscillator 179, an inverter 178, boosting switches 168, 169, 170 and 171, capacitors 175, 176 and 177, and diodes 172, 173 and 174.

The constant-voltage regulated power supply 167 prevents an excessively high voltage that exceeds the withstand voltage of the switching elements from being applied to the switching elements when the output voltage of the dc power source 92 increases.

The cooperative action of the oscillator 179 and the inverter 178 controls the switches 168, 169, 170 and 171 so that the switches 168 and 171 operate in phase, the switches 169 and 170 operate in phase, and the switches 168 and 171, and the switches 169 and 170 are closed alternately, respectively and opened alternately. For example, a current is supplied through the diode 172 to the capacitor 175 to charge the capacitor 175 when the switches 168 and 171 are closed. When the switches 169 and 170 are closed, the potential of the electrode of the lower potential of the capacitor 175 rises to a potential equal to the output voltage of the constant-voltage regulated power supply 167 and the voltage is doubled. Then, the capacitor 176 is charged through the diode 173 by the doubled voltage. When the switches 168 and 171 are closed, the potential of the electrode of the lower potential of the capacitor 176 rises to a potential equal to the output voltage of the constant-voltage regulated power supply 142 and the voltage is tripled. Then, the capacitor 177 is charged through the diode 174 by the tripled voltage. Thus, a voltage high enough to drive the switching elements 42, 43, 44 and 45 can be obtained even if the output voltage of the dc power source 92 drops.

As is apparent from the foregoing description, the present invention realizes an inexpensive, highly reliable, highly accessible information processing apparatus with a liquid crystal display, having a compact construction and capable of operating at a low power consumption and of being powered by a voltage in a wide voltage range.

What is claimed is:

1. An information processing apparatus employing a liquid crystal display, comprising:
   a fluorescent lamp for backlighting a liquid crystal display screen;
   a lighting circuit for supplying ac lighting power to the fluorescent lamp;
   first power supply means for supplying input power to the lighting circuit from a commercial ac power source;
   second power supply means for supplying input power to the lighting circuit from a dc battery when the lighting circuit is not being supplied with the input power from the first power supply means;
   detection means for detecting whether the input power of the lighting circuit is being supplied from the first power supply means or from the second power supply means; and
   control means for controlling the level of the lighting power supplied to the fluorescent lamp in response to a detection signal outputted by the detection means, the level of the lighting power being larger when the input power of the lighting circuit is being supplied from the first power supply means than when the input power of the lighting circuit is being supplied from the second power supply means.

2. An information processing apparatus according to claim 1, further comprising:
   a liquid crystal display; and
   an information processing unit having a keyboard, internal semiconductor electronic circuits and a lid unit joined to the information processing unit;
   wherein the liquid crystal display, the fluorescent lamp, the lighting circuit and the control means are provided in the lid unit.

3. An information processing apparatus according to claim 1, further comprising a rechargeable battery as the dc battery.

4. An information processing apparatus according to claim 1, wherein the first power supply means comprises rectifier means for rectifying the input power from the commercial ac power source, and for outputting dc output power to be supplied to the lighting circuit.

5. An information processing apparatus according to claim 4, further comprising:
   a rechargeable battery as the dc battery;
   wherein the first power supply means further comprises means for charging the dc battery with the dc output power of the rectifier means.

6. An information processing apparatus according to claim 1, wherein the detection means comprises means for comparing the input voltage of the lighting circuit with a predetermined reference voltage, means for outputting a first detection signal which shows that the lighting circuit is being supplied from the first power supply means when the input voltage of the lighting circuit is higher than the reference voltage, and means for outputting a second detection signal which shows that the lighting circuit is being supplied from the second power supply means when the input voltage of the lighting circuit is lower than the reference voltage.

7. An information processing apparatus according to claim 6, wherein the control means comprises means for decreasing the frequency of the lighting power supplied to the fluorescent lamp to a first frequency level when the first detection signal is outputted, and means for increasing the frequency of the lighting power supplied to the fluorescent lamp to a second frequency level when the second detection signal is outputted, said second frequency level being greater than said first frequency level.

8. An information processing apparatus according to claim 1, further comprising means for detecting an increase of the input voltage of the lighting circuit beyond a predetermined upper limit and for detecting a decrease of the input voltage of the lighting circuit below a predetermined lower limit, and means for stopping operation of the lighting circuit when the input voltage increases beyond the predetermined upper limit and for stopping the operation of the lighting circuit when the input voltage decreases below the predetermined lower limit.

9. An information processing apparatus according to claim 8, further comprising means for restarting the operation of the lighting circuit when the input voltage of the lighting circuit is restored into a range defined by the predetermined upper limit and the predetermined lower limit.

10. An information processing apparatus according to claim 1, further comprising:
means for detecting the input current flowing into the lighting circuit; and
means for stopping operation of the lighting circuit upon an increase of the input current flowing into the lighting circuit beyond a predetermined current value.

11. An information processing apparatus according to claim 10, further comprising means for restarting the operation of the lighting circuit when a predetermined time interval has been passed after the operation of the lighting circuit has been stopped.

12. An information processing apparatus employing a liquid crystal display device, comprising:
a fluorescent lamp for backlighting the screen of the liquid crystal display device;
a lighting circuit for supplying ac lighting power to the fluorescent lamp;
power supply means for selectively supplying input power to the lighting circuit from one of a commercial ac power source and a dc battery;
detection means for detecting whether the input power of the lighting circuit is being supplied from the commercial ac power source or from the dc battery; and
control means for controlling the level of the lighting power supplied to the fluorescent lamp in response to a detection signal outputted from the detection means, the level of the lighting power being larger when the input power of the lighting circuit is being supplied from the commercial ac power source than when the input power of the lighting circuit is being supplied from the dc battery.

13. An information processing apparatus according to claim 12, further comprising a rechargeable battery as the dc battery.

14. An information processing apparatus according to claim 12, wherein the detection means comprises means for comparing the input voltage of the lighting circuit with a predetermined reference voltage, means for outputting a first detection signal which shows that the lighting circuit is being supplied from the commercial ac power source when the input voltage of the lighting circuit is higher than the reference voltage, and means for outputting a second detection signal which shows that the lighting circuit is being supplied from the dc battery when the input voltage of the lighting circuit is lower than the reference voltage.

15. An information processing apparatus according to claim 14, wherein the control means comprises means for lowering the frequency of the lighting power supplied to the fluorescent lamp to a first frequency level when the first detection signal is outputted, and means for increasing the frequency of the lighting power supplied to the fluorescent lamp to a second frequency level when the second detection signal is outputted, the second frequency level being greater than the first frequency level.

16. An information processing apparatus according to claim 12, further comprising means for detecting an increase of the input voltage of the lighting circuit beyond a predetermined upper limit and for detecting a decrease of the input voltage of the lighting circuit below a predetermined lower limit, and means for stopping operation of the lighting circuit when the input voltage increases beyond the predetermined upper limit and for stopping the operation of the lighting circuit when the input voltage decreases below the predetermined lower limit.

17. An information processing apparatus according to claim 16, further comprising means for restarting the operation of the lighting circuit when the input voltage of the lighting circuit is restored into a range defined by the predetermined upper limit and the predetermined lower limit.

18. An information processing apparatus according to claim 12, further comprising:
means for detecting the input current flowing into the lighting circuit; and
means for stopping operation of the lighting circuit upon an increase of the input current flowing into the lighting circuit beyond a predetermined current value.

19. An information processing apparatus according to claim 18, further comprising means for restarting the operation of the lighting circuit when a predetermined time interval has been passed after the operation of the lighting circuit has been stopped.

* * * * *